United States Patent
Adams et al.

(10) Patent No.: US 12,143,039 B2
(45) Date of Patent: Nov. 12, 2024

(54) ENERGY-SUPPLY SYSTEM FOR SUPPLYING ENERGY TO AN ELECTRICAL LOAD FROM A BATTERY

(71) Applicant: Lutron Technology Company LLC, Coopersburg, PA (US)

(72) Inventors: Jason O. Adams, Emmaus, PA (US); Edward J. Blair, Telford, PA (US); Stuart W. DeJonge, Riegelsville, PA (US); Olli T. Friman, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 582 days.

(21) Appl. No.: 17/327,548

(22) Filed: May 21, 2021

(65) Prior Publication Data
US 2021/0367542 A1    Nov. 25, 2021

Related U.S. Application Data

(60) Provisional application No. 63/028,859, filed on May 22, 2020.

(51) Int. Cl.
*E06B 9/72* (2006.01)
*H02J 7/00* (2006.01)
*H02P 23/00* (2016.01)

(52) U.S. Cl.
CPC ............. *H02P 23/00* (2013.01); *E06B 9/72* (2013.01); *H02J 7/0063* (2013.01); *H02J 7/007* (2013.01)

(58) Field of Classification Search
CPC ...... H02J 7/0063; H02J 7/0047; H02J 7/0048; H02J 7/007; H02P 23/00; E06B 9/72; E06B 9/68; E06B 2009/6809
See application file for complete search history.

(56) References Cited

U.S. PATENT DOCUMENTS

| | | | |
|---|---|---|---|
| 5,134,347 A * | 7/1992 | Koleda | G08C 17/00 388/933 |
| 6,497,267 B1 | 12/2002 | Killo et al. | |
| 7,389,806 B2 | 6/2008 | Kates | |
| 7,839,109 B2 * | 11/2010 | Carmen, Jr. | H02P 7/29 318/466 |
| 8,299,734 B2 | 10/2012 | Mullet et al. | |
| 8,371,358 B1 | 1/2013 | Mullet et al. | |
| 8,365,800 B2 | 2/2013 | Oh et al. | |

(Continued)

FOREIGN PATENT DOCUMENTS

EP    2631411 B1    9/2014

OTHER PUBLICATIONS

Wacker, A., "Supplying TPS61200 With a Single Solar Cell", Texas Instruments, Aug. 2009, 8 pages.

*Primary Examiner* — Johnnie A. Shablack
(74) *Attorney, Agent, or Firm* — Flaster Greenberg, P.C.

(57) ABSTRACT

A motorized window treatment may be configured to adjust a position of a covering material to control the amount of daylight entering a space. The motorized window treatment may include a DC power source for charging an energy storage element, such as a supercapacitor and/or rechargeable battery. The energy storage element may be configured to provide power for the operation of a motor used to adjust the position of the covering material. The energy storage element may discharge when providing power to the motor and may charge such that the current it draws from a battery is at a desired average current level that extends the lifetime of the battery.

28 Claims, 13 Drawing Sheets

(56) References Cited

U.S. PATENT DOCUMENTS

| | | |
|---|---|---|
| 8,368,328 B2 | 2/2013 | Mullet et al. |
| 8,540,005 B2 | 9/2013 | Baugh et al. |
| 8,632,034 B2 | 1/2014 | Mitchell et al. |
| 8,659,246 B2 | 2/2014 | Mullet et al. |
| 8,791,658 B2 | 7/2014 | Mullet et al. |
| 8,851,141 B2 | 10/2014 | Blair et al. |
| 8,919,419 B2 | 12/2014 | Mullet et al. |
| 8,950,461 B2 | 2/2015 | Ogden, Jr. et al. |
| 9,013,059 B2 * | 4/2015 | Altonen ............... F24F 11/59 307/31 |
| 9,045,939 B2 | 6/2015 | Blair et al. |
| 9,115,537 B2 | 8/2015 | Blair |
| 9,148,025 B2 * | 9/2015 | Bourgeois ............ H02J 7/0048 |
| 9,488,000 B2 | 11/2016 | Kirby et al. |
| 9,598,901 B2 | 3/2017 | Kirby et al. |
| 9,810,020 B2 | 11/2017 | Adams et al. |
| 9,831,716 B2 * | 11/2017 | Mohammed Suhura ............ H02J 9/061 |
| 9,955,547 B2 * | 4/2018 | Taipale ............... H05B 47/10 |
| 10,094,169 B2 | 10/2018 | Kirby |
| 10,097,014 B2 * | 10/2018 | Pickett ............... H02J 7/0016 |
| 10,601,316 B2 * | 3/2020 | Kohn ................ H02J 7/0063 |
| 10,655,386 B2 * | 5/2020 | Adams ................ E06B 9/70 |
| 10,690,726 B2 * | 6/2020 | Koizumi ............ H01M 10/42 |
| 10,819,158 B2 | 10/2020 | Pearson |
| 11,078,725 B2 * | 8/2021 | Geiger ............... E06B 9/40 |
| 11,205,921 B2 | 12/2021 | Hausman, Jr. et al. |
| 11,375,583 B2 | 6/2022 | Dejonge |
| 11,409,248 B2 * | 8/2022 | Rebbert .............. E06B 9/68 |
| 11,677,245 B2 * | 6/2023 | DeJonge ............. E06B 9/68 307/32 |
| 11,788,348 B2 * | 10/2023 | Blair ................. E06B 9/42 160/10 |
| 2004/0217739 A1 * | 11/2004 | Cummings ........... H02J 7/342 320/137 |
| 2007/0284053 A1 | 12/2007 | Mullet et al. |
| 2008/0236763 A1 | 10/2008 | Kates |
| 2009/0308543 A1 | 12/2009 | Kates |
| 2010/0269988 A1 | 10/2010 | Mullet et al. |
| 2010/0294438 A1 | 11/2010 | Kirby et al. |
| 2011/0203748 A1 | 8/2011 | Mullet et al. |
| 2011/0203754 A1 | 8/2011 | Mullet et al. |
| 2012/0090797 A1 | 4/2012 | Mullet et al. |
| 2012/0225340 A1 | 9/2012 | Mullet et al. |
| 2013/0098561 A1 | 4/2013 | Mullet et al. |
| 2013/0233496 A1 | 9/2013 | Ogden, Jr. et al. |
| 2014/0055061 A1 | 2/2014 | Chambers et al. |
| 2014/0305601 A1 | 10/2014 | Mullet et al. |
| 2014/0352896 A1 * | 12/2014 | Han ................. E06B 9/68 160/310 |
| 2015/0240560 A1 | 8/2015 | Blair et al. |
| 2015/0247362 A1 | 9/2015 | Kirby |
| 2016/0326801 A1 | 11/2016 | Ogden et al. |
| 2017/0356243 A1 | 12/2017 | Feldstein |
| 2018/0202224 A1 | 7/2018 | Kumar |
| 2018/0202225 A1 | 7/2018 | Lagarde |
| 2018/0310745 A1 | 11/2018 | Nirav et al. |
| 2019/0032404 A1 | 1/2019 | Chacon et al. |
| 2019/0214845 A1 | 7/2019 | Hausman et al. |
| 2020/0300037 A1 | 9/2020 | Blair et al. |
| 2021/0285280 A1 * | 9/2021 | Tomczyk ............ E06B 9/68 |
| 2022/0162908 A1 * | 5/2022 | Nien ................ E06B 9/68 |
| 2022/0341259 A1 | 10/2022 | Chacon et al. |
| 2022/0381085 A1 * | 12/2022 | Diehl ............... H01Q 1/22 |
| 2023/0151690 A1 * | 5/2023 | Menendez ........... E06B 9/42 318/255 |
| 2023/0198254 A1 * | 6/2023 | DeJonge ............ H02J 1/084 160/84.02 |
| 2023/0304355 A1 * | 9/2023 | Cooney ............. E06B 9/68 370/311 |
| 2023/0323734 A1 * | 10/2023 | Bruno .............. E06B 9/72 160/1 |

\* cited by examiner

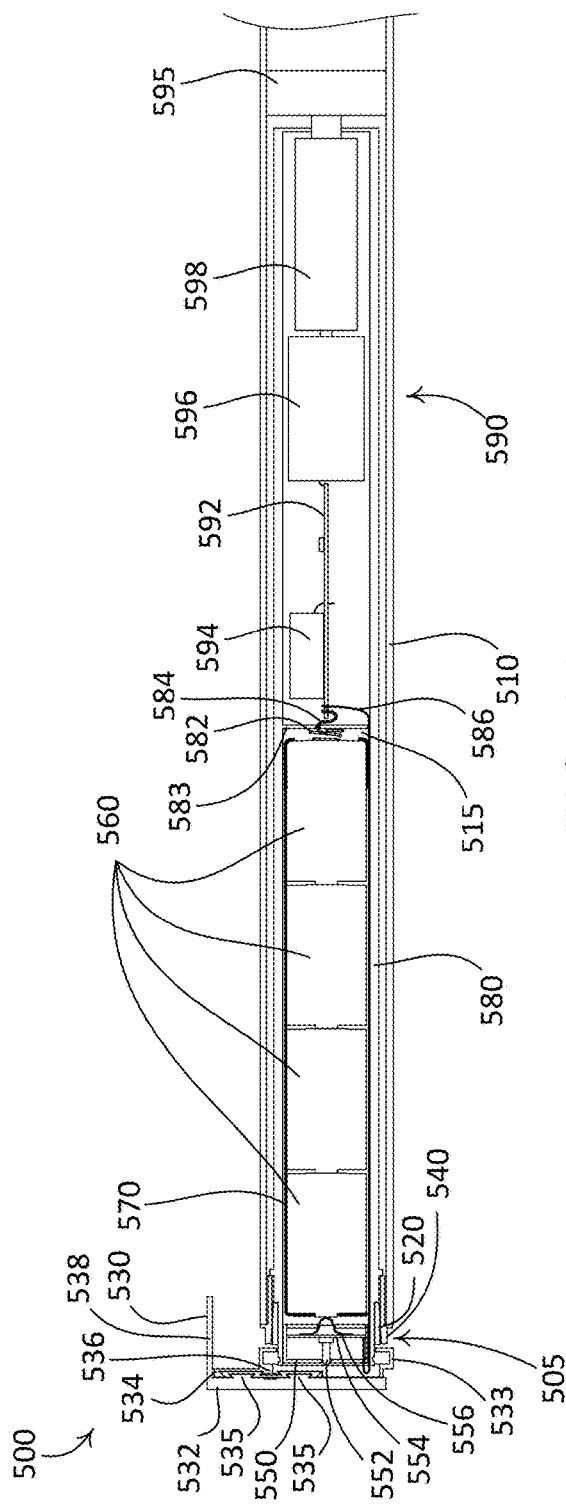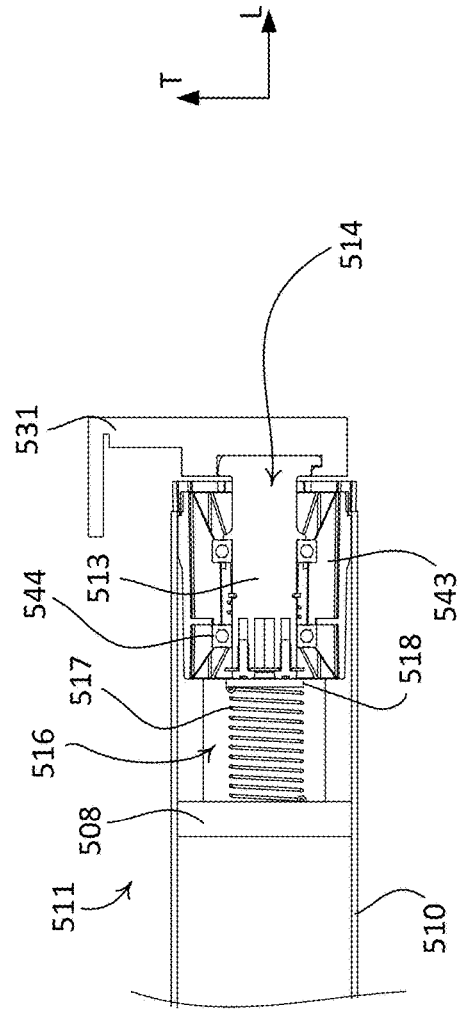
FIG. 3A
FIG. 3B

ENERGY-SUPPLY SYSTEM FOR SUPPLYING ENERGY TO AN ELECTRICAL LOAD FROM A BATTERY

CROSS-REFERENCE TO RELATED APPLICATIONS

This application claims the benefit of U.S. Provisional Patent Application No. 63/028,859, filed May 22, 2020, the contents of which are incorporated herein by reference in their entirety.

BACKGROUND

A typical window treatment, such as a roller shade, a drapery, a roman shade, and/or a venetian blind, may be mounted in front of a window or opening to control an amount of light that may enter a user environment and/or to provide privacy. A covering material (e.g., a shade fabric) on the window treatment may be adjusted to control the amount of daylight from entering the user environment and/or to provide privacy. The covering material may be manually controlled and/or automatically controlled using a motorized drive system to provide energy savings and/or increased comfort for occupants. For example, the covering material may be raised to allow light to enter the user environment and allow for reduced use of lighting systems. The covering material may also be lowered to reduce the occurrence of sun glare.

SUMMARY

A motorized window treatment may include a compartment and a motor drive unit. The compartment can be a part of or separate from the motor drive unit. The compartment may be configured to receive one or more batteries. The batteries (e.g., each battery) may be defined by an open-circuit battery voltage. The motor drive unit may include an energy storage element. The batteries may be comprised of a first battery chemistry, and the energy storage element may be comprised of a second battery chemistry, where the first battery chemistry is different from the second battery chemistry. For example, the one or more batteries comprise alkaline batteries, such as off-the-shelf alkaline batteries that are replaceable by the user. The energy storage element comprises one or more lithium batteries and/or one or more supercapacitors. The batteries may be configured to provide energy storage for powering the motor over a plurality of movements of the covering material, and the energy storage element may be configured to be recharged from the energy storage of the one or more batteries after movements of the covering material. For example, the energy storage element may be charged and discharged a plurality of times over a lifetime of the one or more batteries (e.g., before the batteries need replacement). For example, the energy storage element is charged and discharged a plurality of times during a single discharge of all of the energy storage of the one or more batteries. The compartment may be configured to allow the one or more batteries to be removable and replaceable.

The motor drive unit may include a motor that is configured to control movement of a covering material of the motorized window treatment. The covering material may be configured to be raised and lowered to control an amount of daylight entering a space. The covering material may be integral with the motorized window treatment or provided separately from the motorized window treatment. The motor drive unit may include a power converter circuit that is configured to conduct a battery current from the one or more batteries to charge the energy storage element. The motor drive unit may include motor drive circuit that is configured to draw current from the energy storage element to control power delivered to the motor to control movement of the covering material. The motor drive unit may include a control circuit that is configured to control the battery current such that the open-circuit battery voltage reduces by no more than a set percentage, for example, when power is delivered to the motor to control movement of the covering material and/or throughout a period of time (e.g., a day, week, or month). The set percentage may be 10%, or preferably 5%, or more preferably 3%.

The control circuit may be configured to cause the motor drive circuit to draw the current from the energy storage element at a voltage level that is needed to power to the motor to control movement of the covering material, and the one or more batteries may be unable to provide the battery current at the voltage level that is needed to power the motor to control movement of the covering material (e.g., from a fully-closed and fully-open position) when the batteries have less than a percentage (e.g., 20%, 25%, or 30%) of their maximum energy density. For example, when the batteries have less than a percentage (e.g., 20%, 25%, or 30%) of their maximum energy density, the battery voltage may be below a threshold required to provide the battery current at the voltage level that is needed to power the motor to control movement of the covering material (e.g., from a fully-closed and fully-open position).

The batteries may have an internal resistance that is multiple factors (e.g., 10 times) greater than the internal resistance of the energy storage element. In some examples, the batteries (e.g., each battery) may be characterized by a voltage drop of at least 0.2 V in response to a draw of 0.5 W, and wherein the energy storage element is characterized by a voltage drop of no more than 0.04 V in response to a draw of 0.5 W. Further, in some examples, the batteries the batteries (e.g., each battery) may be characterized by a voltage drop in response to a draw of 0.5 W that is at least 10 times larger than a voltage drop of the energy storage element in response to a draw of 0.5 W.

The control circuit may be configured to control the power converter such that the battery current conducted by the power converter from the one or more batteries to charge the energy storage element does not exceed a threshold current. In some examples, the threshold current may characterized by the one or more batteries maintaining a discharging rate (C-rate) less than 0.01 C or 0.02 C.

The control circuit may be configured to operate in different modes, where each mode is characterized by the motor drive circuit drawing power from a different energy source. For example, the control circuit may be configured to operate in a first mode where the motor drive circuit draws the battery current from the one or more batteries to control the power delivered to the motor to control movement of the covering material, and/or operate in a second mode where the motor drive circuit draws the current from the energy storage element to control the power delivered to the motor to control movement of the covering material. The control circuit may be configured to operate in the first mode when the open-circuit battery voltage of the one or more batteries is above a threshold voltage (e.g., 1.4 V), and operate in the second mode when the open-circuit battery voltage of the one or more batteries is below the threshold voltage. Alternatively or additionally, the control circuit may be configured to switch between modes during operations of the motor. For instance, the control circuit may be configured to operate in the first mode of operation when the current needed by the motor to control movement of the covering material is below a threshold current, and operate in the second mode of operation when a current needed by the motor to control movement of the covering material is above the threshold current.

The motorized window treatment may include a spring assist assembly that is configured to reduce the torque required from the motor drive unit to control movement of the covering material. The spring assist assembly may be configured such that the motor drive unit can operate at a substantially constant torque as the covering material is raised and lowered.

The control circuit may be configured to determine an on-time and an operating period for controlling a semiconductor switch of the power converter circuit to control a magnitude of the battery current conducted by the power converter from the one or more batteries to an average current. The average current may be set such that the open-circuit battery voltage reduces by no more than a percentage (e.g., 10%, 5%, or 3%) when power is delivered to the motor to control movement of the covering material (e.g., from a fully-closed and fully-open position). The control circuit may be configured to control the semiconductor switch of the power converter circuit in accordance with the on-time and the operating period. Further, in some examples, the power converter circuit may include a transformer that has a primary winding coupled in series with the semiconductor switch, and the primary winding may be configured to conduct a primary current through the semiconductor switch when the semiconductor switch is conductive.

Although described primarily in context of a motorized window treatment or a motor drive unit therefor, the apparatus may be used to control other load types. For example, the device may include a load (e.g., a motor) and a compartment configured to receive one or more batteries (e.g., alkaline batteries). The device may also include a load drive unit that includes an energy storage element (e.g., one or more lithium batteries or supercapacitors), a power converter circuit, and a load drive circuit. The power converter circuit may be configured to conduct a battery current from the one or more batteries (e.g., alkaline batteries) to charge the energy storage element (e.g., one or more lithium batteries or supercapacitors). The load drive circuit may be configured to draw current from the energy storage element (e.g., one or more lithium batteries or supercapacitors) to control power delivered to the load. In some examples, the batteries (e.g., alkaline batteries) may be defined by an open-circuit battery voltage, and the power converter circuit may be configured to control the battery current such that the open-circuit battery voltage reduces by no more than a percentage (e.g., 10%, 5%, or 3%) when power is delivered to the load.

The device may also include a control circuit that is configured to operate in multiple modes. For examples, the control circuit may be configured to operate in a first mode where the load drive circuit draws the battery current from the batteries (e.g., alkaline batteries) to control the power delivered to the load, and operate in a second mode where the load drive circuit draws the current from the energy storage element (e.g., one or more lithium batteries or supercapacitors) to control the power delivered to the load. The control circuit may be configured to operate in the first mode when the open-circuit battery voltage of the batteries (e.g., alkaline batteries) is above a threshold voltage, and operate in the second mode when the open-circuit battery voltage of the batteries (e.g., alkaline batteries) is below the threshold voltage. Alternatively or additionally, the control circuit is configured to operate in the first mode of operation when the current needed by the load is below the threshold current, and operate in the second mode of operation when a current needed by the load is above a threshold current.

A motorized window treatment for adjusting the position of a covering material to control the amount of daylight entering a space may include a DC power source (e.g., a battery or batteries) and a motor drive unit that includes an energy storage element, such as a supercapacitor and/or rechargeable battery. The motor drive unit may use the batteries, which may be housed internal or external to the motor drive unit, to charge the energy storage element, and then drive a motor using the energy storage element (e.g., and not drive the motor directly off the batteries, in most operations). For example, the motorized window treatment may charge the energy storage element via a current limiting circuit, such as a power converter circuit. The motor drive unit may charge the energy storage element such that the current it draws from the batteries is at a desired average current level that extends the lifetime of the battery.

The power converter may include a semiconductor switch that is configured to render the power converter conductive and non-conductive. The motor drive unit may be configured to determine an on-time and an operating period, and control the semiconductor switch in accordance with the on-time and the operating period to control a magnitude of a battery current conducted through the one or more batteries to a desired average current. The motor drive unit may be configured to determine the operating period of the semiconductor switch such that the power converter operates in discontinuous conduction mode. For example, the motor drive unit may determine the operating period using a scaling factor so that a magnitude of a secondary current of the power converter circuit always reach zero amps prior to the end of the operating period.

The motor drive unit may include a controllable switching circuit that is coupled between the one or more batteries and the motor drive circuit. The motor drive unit may be configured to render the controllable switching circuit conductive to bypass any combination of the power converter circuit and the energy storage element to allow the motor drive circuit to draw current directly from the one or more batteries, for example, in instances when the energy storage level of the energy storage element is below a threshold (e.g., a threshold amount of power needed to drive the motor to move the covering material).

BRIEF DESCRIPTION OF THE DRAWINGS

FIG. 3A is a front cross-section view of another example battery-powered motorized window treatment taken through the center of a roller tube of the motorized window treatment.

FIG. 3B is a side view of an idler end of the example battery-powered motorized window treatment of FIG. 3A.

DETAILED DESCRIPTION

Figure 1A:
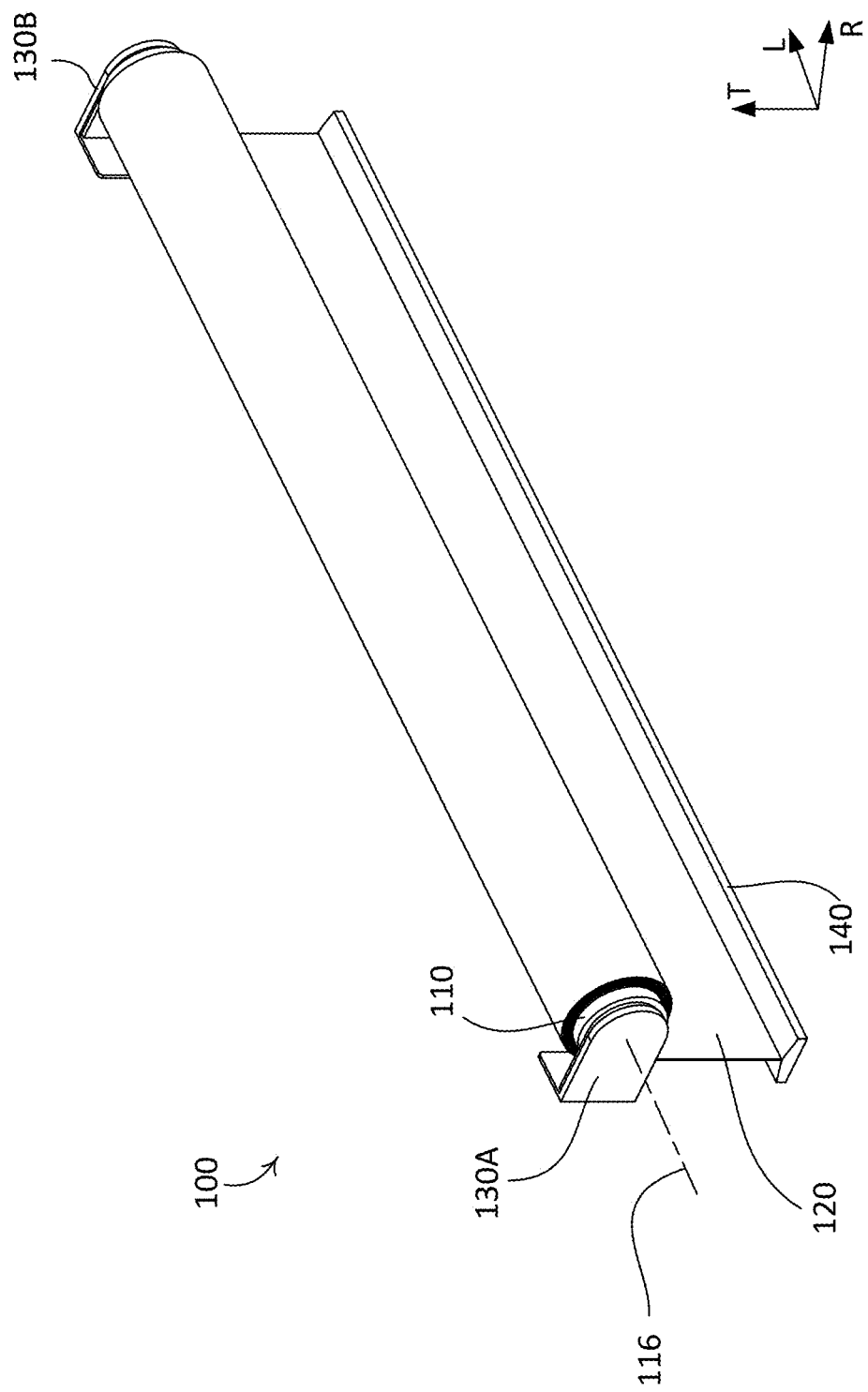
FIG. 1A is an example motorized window treatment.
Figure 1B:
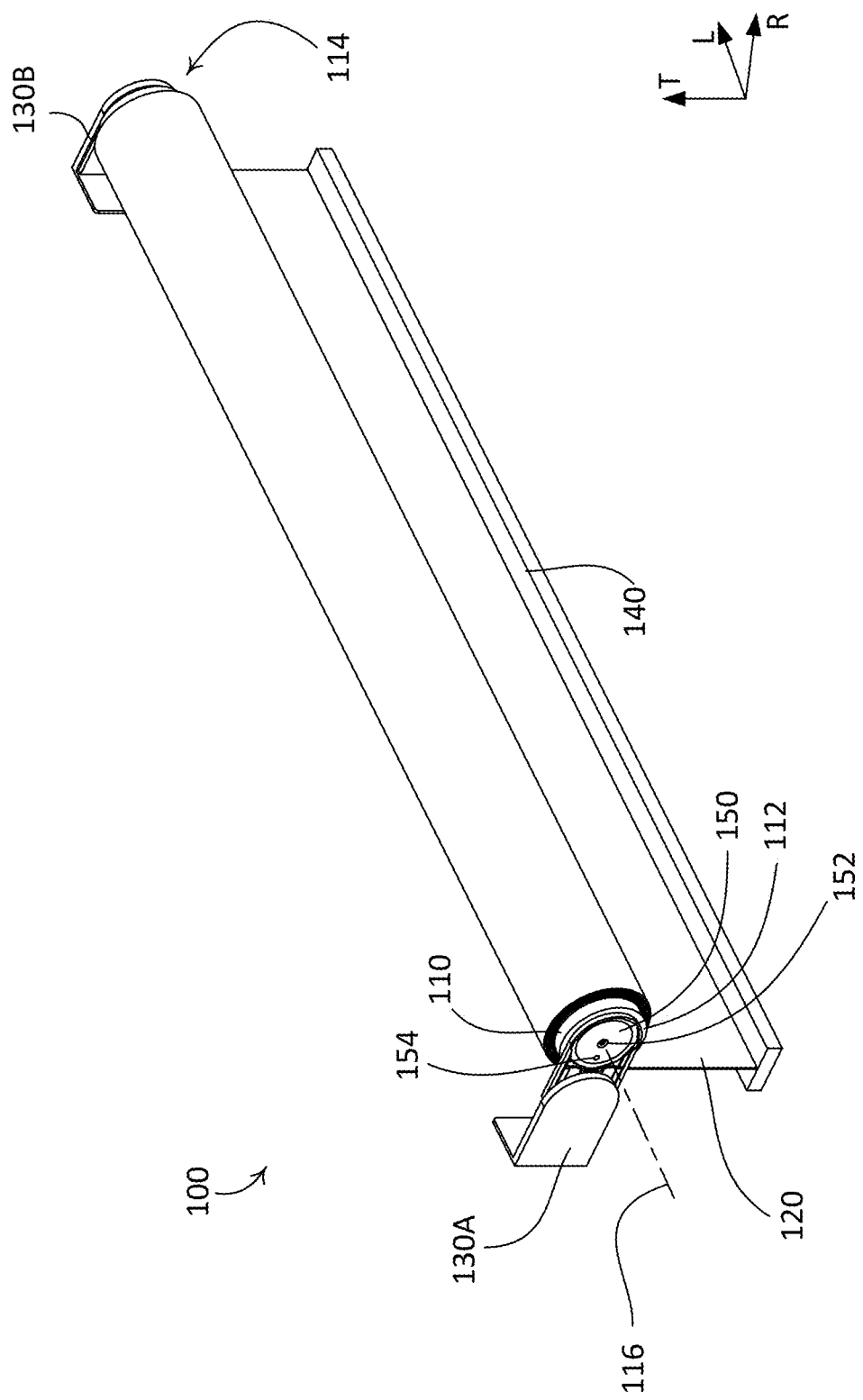
FIG. 1B is a perspective view of the example motorized window treatment of FIG. 1A in an extended position.

FIGS. 1A and 1B depict an example motorized window treatment 100 (e.g., a battery-powered motorized window treatment system) that includes a roller tube 110 and a flexible material 120 (e.g., a covering material) windingly attached to the roller tube 110. The motorized window treatment 100 may include one or more mounting brackets 130A, 130B configured to be coupled to or otherwise mounted to a structure. For example, each of the mounting brackets 130A, 130B may be configured to be mounted to (e.g., attached to) a window frame, a wall, or other structure, such that the motorized window treatment 100 is mounted proximate to an opening (e.g., over the opening or in the opening), such as a window for example. The mounting brackets 130A, 130B may be configured to be mounted to a vertical structure (e.g., wall-mounted to a wall as shown in FIG. 1) and/or mounted to a horizontal structure (e.g., ceiling-mounted to a ceiling). For example, the mounting brackets 130A, 130B may be rotated 90 degrees from what is shown in FIG. 1.

The roller tube 110 may operate as a rotational element of the motorized window treatment 100. The roller tube 110 may be elongate along a longitudinal direction L and rotatably mounted (e.g., rotatably supported) by the mounting brackets 130. The roller tube 110 may define a longitudinal axis 116. The longitudinal axis 116 may extend along the longitudinal direction L. The mounting bracket 130A may extend from the structure in a radial direction R, as shown in FIG. 1B. It should be appreciated that when the mounting brackets 130 are ceiling-mounted, the mounting bracket 130A may extend from the structure in a transverse direction T. The radial direction R may be defined as a direction perpendicular to the structure and the longitudinal axis 116. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised (e.g., open) position (e.g., as shown in FIG. 1) and a lowered (e.g., closed) position along the transverse direction T.

The roller tube 110 may be made of aluminum. The roller tube 110 may be a low-deflection roller tube and may be made of a material that has high strength and low density, such as carbon fiber. The roller tube 110 may have, for example, a diameter of approximately two inches. For example, the roller tube 110 may exhibit a deflection of less than ¼ of an inch when the flexible material 120 has a length of 12 feet and a width of 12 feet (e.g., and the roller tube 110 has a corresponding width of 12 feet and the diameter is two inches). Examples of low-deflection roller tubes are described in greater detail in U.S. Patent Application Publication No. 2016/0326801, published Nov. 10, 2016, entitled LOW-DEFLECTION ROLLER SHADE TUBE FOR LARGE OPENINGS, the entire disclosure of which is hereby incorporated by reference.

The flexible material 120 may include a first end (e.g., a top or upper end) that is coupled to the roller tube 110 and a second end (e.g., a bottom or lower end) that is coupled to a hembar 140. The hembar 140 may be configured, for example weighted, to cause the flexible material 120 to hang vertically. Rotation of the roller tube 110 may cause the hembar 140 to move toward or away from the roller tube 110 between the raised and lowered positions.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material 120.

The motorized window treatment 100 may include a drive assembly (e.g., such as the motor drive unit 590 shown in FIG. 3A). The drive assembly may at least partially be disposed within the roller tube 110. For example, the drive assembly may be retained within a motor drive unit housing (e.g., such as the motor drive unit housing 580 shown in FIG. 3A) that is received within the roller tube 110. The drive assembly may include a control circuit that may include a microprocessor and may be mounted to a printed circuit board. The drive assembly may be powered by a power source (e.g., an alternating-current or direct-current power source) provided by electrical wiring and/or batteries (e.g., as shown in FIGS. 3A-5). The drive assembly may be operably coupled to the roller tube 110 such that when the drive assembly is actuated, the roller tube 110 rotates. The drive assembly may be configured to rotate the roller tube 110 of the example motorized window treatment 100 such that the flexible material 120 is operable between the raised position and the lowered position. The drive assembly may be configured to rotate the roller tube 110 while reducing noise generated by the drive assembly (e.g., noise generated by one or more gear stages of the drive assembly). Examples of drive assemblies for motorized window treatments are described in greater detail in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 9,598,901, issued Mar. 21, 2017, entitled QUIET MOTORIZED WINDOW TREATMENT SYSTEM, the entire disclosures of which are hereby incorporated by reference.

The motorized window treatment 100 may be configured to enable access to one or more ends of the roller tube 110 while remaining secured to the mounting brackets 130A, 130B. For example, the motorized window treatment 100 may be adjusted (e.g., pivoted or slid) between an operating position (e.g., as shown in FIG. 1) to an extended position (e.g., as shown in FIG. 1B) while secured to the mounting brackets 130A, 130B. The operating position may be defined as a position in which the roller tube 110 is supported by and aligned with both mounting brackets 130A, 130B. The extended position may be defined as a position in which one or more ends of the roller tube 110 are accessible while still attached to the brackets 130A, 130B. Operation of the motorized window treatment 100 may be disabled when it is adjusted between the operating position and the extended position. For example, operation of the motorized window treatment 100 may disabled when the extended position is reached. Alternatively, operation of the motorized window treatment 100 may be disabled at some point between the operating position and the extended position, for example, when the motorized window treatment 100 exits the operating position. Operation of the motorized window treatment 100 may be enabled when it enters the operating position.

When in the extended position, the one or more ends of the roller tube 110 may be accessed, for example, to replace batteries, adjust one or more settings, make an electrical connection, repair one or more components, and/or the like. One or more of the mounting brackets 130A, 130B may enable an end of the roller tube 110 to be accessed when the motorized window treatment is in the extended position. One or more of the mounting brackets 130A, 130B may include a sliding portion to enable the end of the roller tube 110 to be accessible. For example, a first portion (e.g., sliding portion) of one or more of the mounting brackets 130A, 130B may extend from a second portion (e.g., fixed portion). For example, a sliding portion of one or more of the mounting brackets 130A, 130B may be adjusted with respect to a fixed portion, for example, to expose a respective end of the roller tube 110.

One end of the roller tube may slide out when the motorized window treatment is in the extended position. For example, one of the mounting brackets (e.g., mounting bracket 130A) may be configured to slide out and the other one of the mounting brackets (e.g., mounting bracket 130B) may remain stationary when the motorized window treatment 100 (e.g., the roller tube 110) is in the extended position, for example, as shown in FIG. 1B. The extended position of the motorized window treatment 100 may include a first end 112 of the roller tube 110 proximate to a first mounting bracket (e.g., mounting bracket 130A) being further from a window and/or the structure to which the first mounting bracket is anchored than when the motorized window treatment 100 is in the operating position. A second end 114 (e.g., opposite the first end 112) of the roller tube 110 proximate to the second mounting bracket (e.g., mounting bracket 130B) may remain substantially fixed when the motorized window treatment 100 is in the extended position, for example, as shown in FIG. 1B. Stated differently, the roller tube 110 may pivot between the operating position and the extended position. The second end 114 of the roller tube 110 and the mounting bracket 130B may define a fulcrum about which the motorized window treatment 100 (e.g., the roller tube 110) pivots.

Alternatively, both ends of the roller tube may slide out when the motorized window treatment is in the extended position. For example, both of the mounting brackets 130A, 130B may be configured to slide out. That is, both of the mounting brackets 130A, 130B may include sliding portions. In this configuration, both the first end 112 and the second end 114 may be further from the window and/or the structure when the motorized window treatment 100 is in the extended position. Stated differently, the motorized window treatment 100 may slide between the operating position and the extended position. When both ends of the roller tube are configured to slide out, two people may be required to operate the motorized window treatment 100 between the operating position and the extended position.

When the motorized window treatment 100 is in the extended position, a motor drive unit housing end 150 (e.g., cap 250 shown in FIGS. 2A and 2B) may be exposed (e.g., accessible). The motor drive unit housing end 150 may be located proximate to the first end 112 of the roller tube 110. The motor drive unit housing end 150 may cover a cavity of the roller tube 110. The motor drive unit housing end 150 may be configured to be removably secured to the roller tube 110 (e.g., the first end 112 of the roller tube 110). For example, the motor drive unit housing end 150 may be configured to be secured within the cavity. The motor drive unit housing end 150 may be configured to retain one or more components (e.g., such as the batteries 260 shown in FIGS. 2A and 2B).

The motor drive unit housing end 150 may include a control button 152. The control button 152 may be backlit. For example, the control button 152 may include a light pipe (e.g., may be translucent or transparent) that is illuminated by a light emitting diode (LED) within the motor drive unit housing. The control button 152 may be configured to enable a user to change one or more settings of the motorized window treatment 100. For example, the control button 152 may be configured to change one or more wireless communication settings and/or one or more drive settings. The control button 152 may be configured to enable a user to pair the motorized window treatment 100 with a remote control device to allow for wireless communication between the remote control device and a wireless communication circuit (e.g., an RF transceiver) in the motor drive unit housing end 150. The control button 152 may be configured to provide a status indication to a user. For example, the control button 152 may be configured to flash and/or change colors to provide the status indication to the user. The status indication may indicate when the motorized window treatment 100 is in a programming mode.

The motor drive unit housing end 150 may include a disable actuator 154 that is configured to deactivate (e.g., automatically deactivate) the drive assembly when the roller tube 110 is not in the operating position. For example, the disable actuator 154 may be configured to disable the drive assembly such that the covering material cannot be raised or lowered when the roller tube 110 is not in the operating position. The disable actuator 154 may disable a motor of the drive assembly, for example, when the roller tube 110 is pivoted (e.g., or slid) from the operating position to the extended position. The disable actuator 154 may enable the motor when the roller tube 110 reaches the operating position. The disable actuator 154 may be a button, a magnetic sensor, an IR sensor, a switch, and/or the like.

Figure 2A:
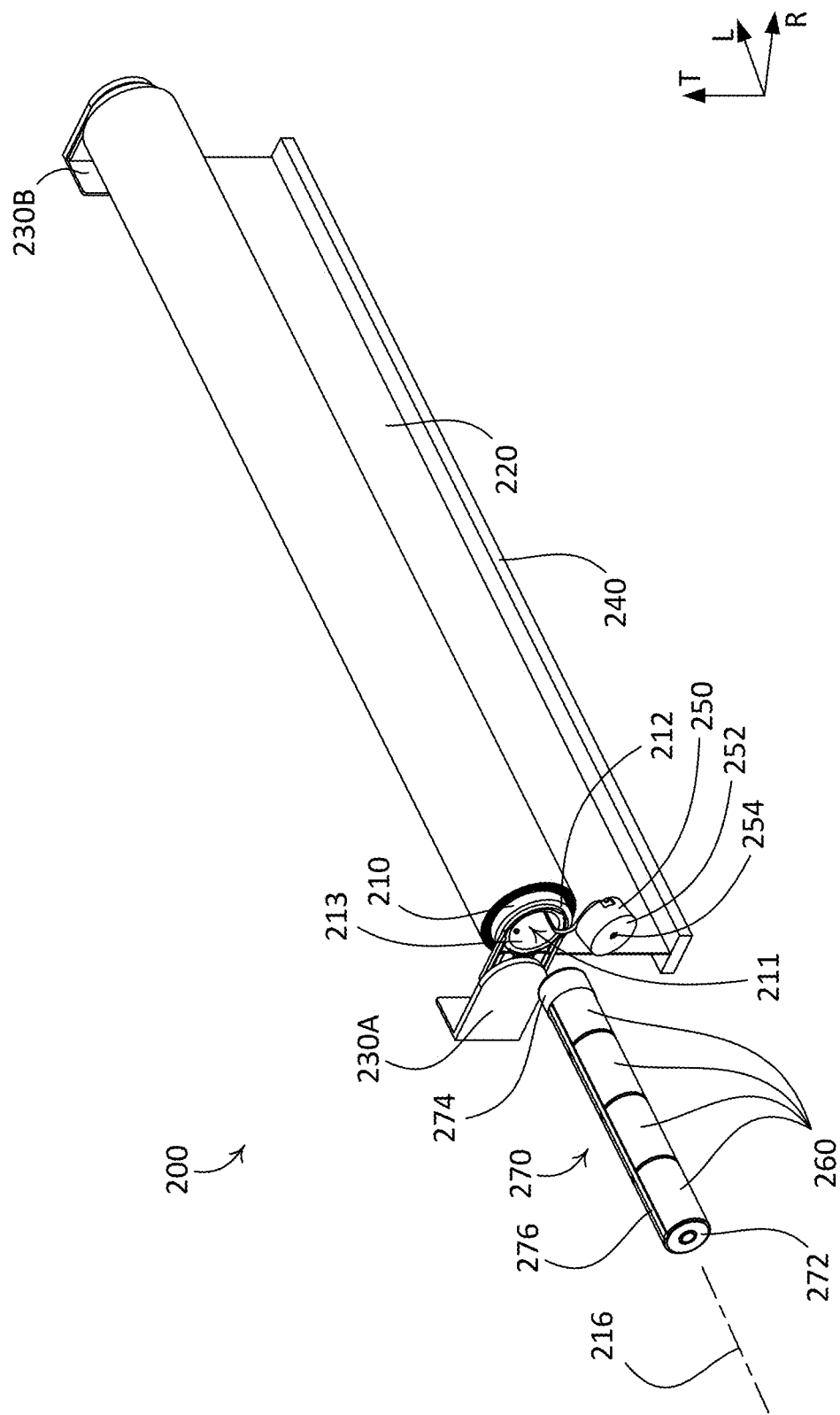
FIG. 2A is a perspective view of an example battery-powered motorized window treatment with the batteries removed.
Figure 2B:
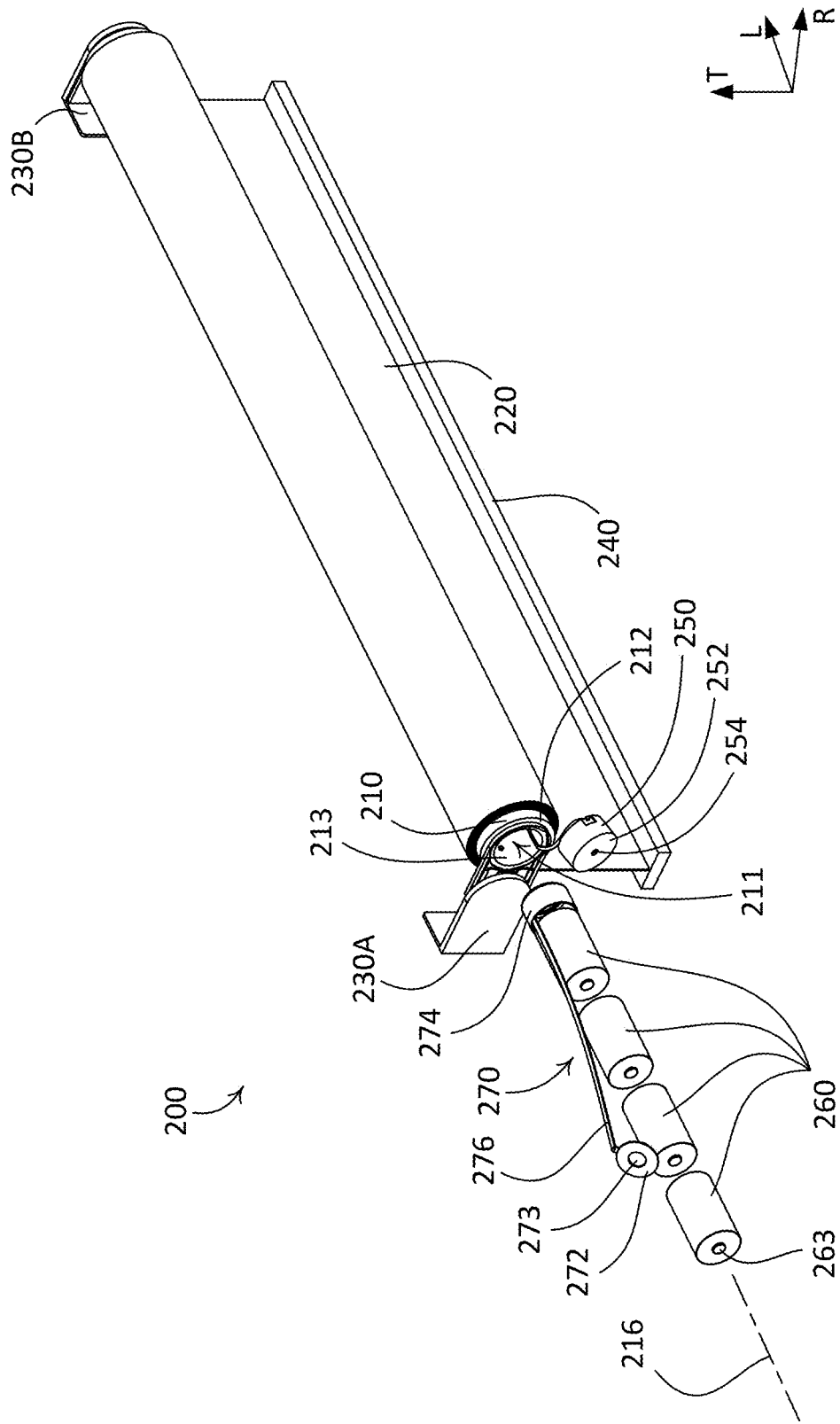
FIG. 2B is another perspective view of the example battery-powered motorized window treatment shown in FIG. 2A with the batteries removed.

FIGS. 2A and 2B depict an example battery-powered motorized window treatment 200 (e.g., such as the motorized window treatment 100 shown in FIG. 1). The battery-powered motorized window treatment 200 may include a roller tube 210 (e.g., such the roller tube 110 shown in FIG. 1), a flexible material 120 (e.g., a covering material) windingly attached to the roller tube 210, a drive assembly (e.g., such as the motor drive unit 590 shown in FIG. 3A), and a plurality of batteries 260. The battery-powered motorized window treatment 200 may further include a hembar 240 (e.g., such as the hembar 140 shown in FIGS. 1A and 1B) and one or more mounting brackets 230A, 230B (e.g., such as the mounting brackets 130A, 130B shown in FIGS. 1A and 1B). The battery-powered motorized window treatment 200 (e.g., the drive assembly) may be powered by the batteries 260. Although the battery-powered motorized window treatment 200 is shown with four batteries 260, it should be appreciated that the battery-powered motorized window treatment 200 may include a greater or smaller number of batteries. The roller tube 210 may define a longitudinal axis 216. The longitudinal axis 216 may extend along a longitudinal direction L.

The battery-powered motorized window treatment 200 may include a cap 250 that is configured to retain the batteries 260 within the roller tube 210. The cap 250 may define an outer surface 252 with a button 254. The button 254 may be backlit. For example, the button 254 may include a light pipe that is illuminated by an LED within the cap 250. The button 254 may be configured to enable a user to change one or more settings of the battery-powered motorized window treatment 200. The button 254 may be configured to enable a user to pair the battery-powered motorized window treatment 200 with a remote control device to allow for wireless communication between the remote control device and the wireless communication circuit in the cap 250. The button 254 may be configured to provide a status indication to a user. For example, the button 254 may be configured to flash and/or change colors to provide the status indication to the user. The button 254 may indicate when the battery-powered motorized window treatment 200 is in a programming mode, for example, via the status indication.

The drive assembly may be at least partially received within the roller tube 210. For example, the roller tube 210 may define a cavity 211 (e.g., a battery compartment) that is configured to receive one or more components of the drive assembly. The cavity 211 may be defined by the inner surface 213 of the roller tube 210. The cavity 211 may be accessible when the battery-powered motorized window treatment 200 is in the extended position (e.g., pivoted) and the cap 250 is removed.

The battery-powered motorized window treatment 200 may include a battery holder 270. The battery holder 270 may be configured to keep the batteries 260 fixed in place securely while the batteries 270 are providing power to the drive assembly. The battery holder 270 may be configured to clamp the batteries 260 together (e.g., as shown in FIG. 2A) such that the batteries 260 can be removed from the battery-powered motorized window treatment 200 at the same time (e.g., together). The battery holder 270 may include a head 272, a base 274, and an arm 276 connecting the head 272 and the base 274. The battery holder 270 may create a spring tension to hold the batteries 260 together. For example, the head 272, the base, 274, and the arm 276 may be configured to apply a tension force to the batteries 260.

The head 272 may define an aperture 273 that is configured to receive a nub 263 of one of the batteries 260, for example, such that the nub 263 can be electrically connected to the cap 250. For example, the nub 263 may extend beyond the head 272 when the batteries are clamped within the battery holder 270. The base 274 may define an aperture configured to receive a spring (e.g., such as spring 486 shown in FIG. 3A) to electrically connect the batteries 260 to a printed circuit board of the motor drive unit. For example, the spring may be located within the cavity 211 proximate to the motor drive unit. Additionally or alternatively, the base 274 may include an electrical contact (e.g., a negative contact). The electrical contact of the battery holder 270 may be electrically connected to the printed circuit board of the motor drive unit. The base 274 (e.g., the electrical contact) may be configured to abut the spring within the roller tube 210 (e.g., the motor drive unit housing). One or more of the batteries 260 may be received (e.g., at least partially received) within the base 274. The battery holder 270 may be configured to be removed from the roller tube 210 (e.g., the cavity 211 of the roller tube 210) while clamping the batteries 260. Although the battery holder 270 is shown having the arm 276, it should be appreciated that the battery holder 270 may include alternate means for clamping and/or securing the batteries 260 together. For example, the battery holder 270 may include a sleeve between the head 272 and the base 274. The sleeve may be configured to surround the batteries 260.

The battery holder 270 may be configured to be removed (e.g., completely removed as shown in FIG. 2A) from the roller tube 210. When the battery holder 270 is removed from the roller tube 210, the batteries 260 may be removed from the battery holder 270 (e.g., as shown in FIG. 2B) while still clamped together. Replacement batteries may be installed in the battery holder 270 and the battery holder 270 may be installed within the cavity 211 of the roller tube 210. When the battery holder 270 is installed within the roller tube 210 (e.g., the cavity 211), the cap 250 may be removably secured to the roller tube 210 (e.g., the end 212), for example, to secure the battery holder 270 within the roller tube 210. Additionally or alternatively, the cap 250 may be configured to be removably secured to the motor drive unit housing.

FIG. 3A depicts an example battery-powered motorized window treatment 500 (e.g., such as the motorized window treatment 100 shown in FIGS. 1A and 1B, and/or the battery-powered motorized window treatment 200 shown in FIGS. 2A and 2B) in an operating position. The battery-powered motorized window treatment 500 may include a roller tube 510, a motor drive unit 590, a plurality of batteries 560, and one or more mounting brackets 530. The operating position may be defined as a position in which the roller tube 510 is supported by and aligned with both mounting brackets 530. The battery-powered motorized window treatment 500 may be configured to be operated between the operating position and an extended position, for example, to enable access to replace the batteries 560. The extended position may be defined as a position in which one or more ends of the roller tube 510 are accessible while still attached to the mounting brackets 530. The extended position may define a pivoted position, for example, as shown in FIG. 2, where one of the mounting brackets 530 extends such that the batteries 560 are accessible via the end of the roller tube 510. Although not shown in FIG. 3A, the battery-powered motorized window treatment 500 may include a flexible material windingly attached to the roller tube 510 and a hembar that is coupled to a bottom or lower end of the flexible material.

The mounting bracket 530 may be configured to attach the battery-powered motorized window treatment 500 to a horizontal structure (e.g., such as a ceiling). The mounting bracket 530 may define a base 538 and an arm 532. The base 538 and the arm 532 may define a stationary portion of the mounting bracket 530. The mounting bracket 530 may define a translating portion 534. The translating portion 534 may include an attachment member 533 that is configured to receive an end of the roller tube 510 and/or a motor drive unit housing 580. The attachment member 533 may define an aperture. The base 538 may be configured to attach the mounting bracket 530 to a structure. The structure may include a window frame, a wall, a ceiling, or other structure, such that the motorized window treatment is mounted proximate to an opening (e.g., over the opening or in the opening), such as a window for example. When the mounting bracket 530 is attached to a vertical structure, such as a wall, the arm 532 of the mounting bracket 530 may extend horizontally (e.g., in the radial direction R) from the base 538.

The translating portion 534 may be configured to translate the roller tube 510 between the operating position and the extended position. The translating portion 534 may be proximate to the base 538 when in the operating position and distal from the base 538 when in the extended position. The end of the roller tube 510 and/or the motor drive unit housing 580 may be accessible via the aperture (e.g., to replace the batteries 560) when the translating portion 534 is in the extended position.

The arm 532 may define one or more features that enable the translating portion 534 to be translated between the operating position and the extended position while remaining attached thereto. The translating portion 534 may define one or more corresponding features that are configured to cooperate with the one or more features on the arm 532. The arm 532 may define one or more slides 535 (e.g., an upper slide and a lower slide). The slides 535 may protrude from an inner surface of the arm 532. The translating portion 534 may define one or more channels (e.g., an upper channel and a lower channel) that are configured to receive the slides 535. The translating portion 534 may define a middle slide 536, for example, between the channels. The arm 532 may define a channel (e.g., a middle channel) that is configured to receive the middle slide 536. The slides 535, 536 and the channels may define angled edges (e.g., tapered edges) such that the attachment of the translating position 534 to the arm 532 defines an interlocking slide, e.g., such as a dovetail slide. The translating portion 534 may translate along the slides 535 between the operating position and the extended position. For example, the translating portion 534 may translate along the slides 535 in the radial direction R.

The mounting bracket 530 may be configured to be secured (e.g., locked) in the operating position and the extended position. The mounting bracket 530 (e.g., the translating portion) may define a locking tab. In addition, the mounting bracket 530 may comprise a release button (not shown) that may need to be actuated by a user in order to be released the mounting bracket 530 from the operating position and be moved into the extended position.

The motor drive unit 590 may include a motor drive printed circuit board 592, an intermediate storage device 594, a motor 596, and a gear assembly 598. The intermediate storage device 594 may include one or more capacitors (e.g., super capacitors) and/or one or more rechargeable batteries. The motor drive unit 590 may be operatively coupled to the roller tube 510, for example, via a coupler 595. The coupler 595 may be an output gear that is driven by the motor 596 and transfers rotation of the motor 596 to the roller tube 510. For example, the coupler 595 may define a plurality of grooves 597 about its periphery. An inner surface of the roller tube 510 may be splined. That is, the inner surface of the roller tube 510 may define a plurality of splines 512. The grooves 597 may be configured to engage respective splines 512 such that rotation of the motor 596 is transferred to the roller tube 510, for example, via the coupler 595. The motor drive unit 590 may be configured to detect when one or more batteries 560 are not installed, for example, in the operating position. When the motor drive unit 590 detects that one or more batteries 560 are not installed and the roller tube 510 is in the operating position, the motor drive unit 590 may prevent rotation of the roller tube 510. In doing so, the motor drive unit 590 may prevent depletion of the intermediate storage device 594.

The battery-powered motorized window treatment 500 (e.g., the motor drive unit 590) may include an inner bearing 520 and an outer bearing 540 that are located external to the roller tube 510. The inner bearing 520 and the outer bearing 540 may be non-metallic (e.g., plastic) sleeve bearings. The inner bearing 520 and the outer bearing 540 may be captured between the roller tube 510 and the mounting bracket 530. The inner bearing 520 may engage the motor drive unit housing 580. The inner bearing 520 may be operatively coupled to the motor drive unit housing 580. For example, the inner bearing 520 may define splines (not shown) that are configured to be received by grooves 588 around the periphery of the motor drive unit housing 580. The inner bearing 520 may be press fit onto the motor drive unit housing 580. The outer bearing 540 may engage the roller tube 510. The outer bearing 540 may be operatively coupled to the roller tube 510. The outer bearing 540 may rotate with the roller tube 510. The outer bearing 540 may be press fit into engagement with the roller tube 510. For example, the outer bearing 540 may engage the plurality of splines 512 of the roller tube 510. The inner bearing 520 may remain stationary with the motor drive unit housing 580 as the roller tube 510 rotates. Stated differently, the roller tube 510 and the outer bearing 540 may rotate about the inner bearing 520 and the motor drive unit housing 580.

The batteries 560 may be configured to be removed from the roller tube 510, for example, while the motor drive unit housing 580 remains engaged with the mounting brackets 530. That is, the batteries 560 may be configured to be removed from the roller tube 510 when the battery-powered motorized window treatment 500 is in the pivoted position. An inside diameter of the inner bearing 520 may be greater than an outer diameter of the batteries 560 and/or the battery holder 570.

The battery-powered motorized window treatment 500 (e.g., the motor drive unit 590) may include a battery holder 570 and a cap 550. The battery holder 570 and the cap 550 may keep the batteries 560 fixed in place securely while the batteries 570 are providing power to the motor drive unit 590 and/or the cap 550. The battery holder 570 may be configured to clamp the batteries 560 together such that the batteries 560 can be removed from the battery-powered motorized window treatment 200 at the same time (e.g., together).

The battery holder 570 may be received in a motor drive unit cavity 588 of the motor drive unit 590. The motor drive unit cavity 588 may extend in the longitudinal direction L from an end 581 of the motor drive unit 590 (e.g., the motor drive unit housing 580) to an internal wall 583 of the motor drive unit 590. The motor drive unit cavity 588 may be open at the end 581. The motor drive unit 590 may be received within a roller tube cavity 515. The roller tube cavity 515 may be open proximate to an end of the roller tube 510. The roller tube cavity 515 may extend in the longitudinal direction L along the entire length of the roller tube 510. The cap 550 may be configured to cover the end 581 to the motor drive unit cavity 588. For example, the cap 550 may be received (e.g., at least partially) within the motor drive unit cavity 588. The cap 550 may include a button 552, one or more wireless communication components mounted to the control interface printed circuit board 554, and an electrical contact 556 electrically connected to the control interface printed circuit board 554. The electrical contact 556 may be a positive electrical contact, for example, as shown in FIG. 3A. Alternatively, the electrical contact 556 may be a negative electrical contact. The cap 550 may include a switch 555 (e.g., a mechanical tactile switch) mounted to the control interface printed circuit board 554 and configured to be actuated in response to actuations of the button 552. The button 552 may operate as a light pipe (e.g., may be translucent or transparent), and may be illuminated by an LED (not shown) mounted to the control interface printed circuit board 554.

The cap 550 may include a switch or button (e.g., button 154 shown in FIG. 1B) that is configured to deactivate (e.g., automatically deactivate) the motor drive unit 590 when the roller tube 510 is not in the operating position. The switch or button may disable the motor 596 of the motor drive unit 590, for example, when the roller tube 510 is pivoted (e.g., or slid) from the operating position to the extended position. The switch or button may enable the motor 596 when the roller tube 510 reaches the operating position.

The batteries 560 may be located between the cap 550 (e.g., the wireless communication components of the motor drive unit 590 of the battery-powered motorized window treatment 500) and the motor drive unit 590. For example, the wireless communication components in the cap 550 may be located at a first end of the batteries 560 installed in the roller tube 510 and the motor drive unit 590 may be located at an opposed second end of the batteries 560.

The one or more wireless communication components within the cap 550 may be electrically coupled to an antenna (not shown). The antenna may be a loop antenna that is located around a periphery of the radio printed circuit board 554. Alternatively, the antenna may be a monopole. The antenna may be located proximate to a gap 505 between the bracket 530 and the roller tube 510. The gap 505 includes non-metal components such that radio-frequency interference and/or shielding is minimized. For example, the battery-powered motorized window treatment 500 may not include metal components at the gap 505. The inner bearing 520 and/or the outer bearing 540 may be disposed within or proximate to the gap 505.

The gap 505 between the roller tube 510 and the bracket 530 may also be configured to enable a predetermined tolerance (e.g., angular misalignment tolerance) between the roller tube 510 and the bracket 530 in a pivoted position. For example, when the battery-powered motorized window treatment 500 is in the pivoted position, the gap 505 may enable a portion of the roller tube 510 to be closer to the bracket 530 (e.g., without contacting the bracket 530) than another portion of the roller tube 510. When the battery-powered motorized window treatment 500 is in the pivoted position, the gap 505 may be configured such that the roller tube 510 does not abut the bracket 530.

The electrical contact 556 may be electrically connected to the control interface printed circuit board 554. The button 552 may be backlit. For example, the button 552 may include a light pipe that is illuminated by the LED within the cap 550 and mounted to the control interface printed circuit board 554. The button 552 may be configured to enable a user to change one or more settings of the battery-powered motorized window treatment 500. For example the button 552 may be configured to change one or more settings of the control interface printed circuit board 554 and/or a motor printed circuit board 592. The button 552 may be configured to enable a user to pair the battery-powered motorized window treatment 500 with a remote control device to allow for wireless communication between the remote control device and the wireless communication circuit mounted to the control interface printed circuit board 554 in the cap 250. The button 552 may be configured to provide a status indication to a user. For example, the control button 552 may be configured to flash and/or change colors to provide the status indication to the user. The button 552 may be configured to indicate (e.g., via the status indication) whether the motor drive unit 590 is in a programming mode.

The control interface printed circuit board 554 and the motor printed circuit board 592 may be electrically connected. For example, the battery-powered motorized window treatment 500 may include a ribbon cable 586. The ribbon cable 586 may be attached to the control interface printed circuit board 554 and the motor printed circuit board 592. The ribbon cable 586 may be configured to electrically connect the control interface printed circuit board 554 and the motor printed circuit board 592. The ribbon cable 586 may terminate at the control interface printed circuit board 554 and the motor printed circuit board 592. For example, the ribbon cable 586 may extend within the cavity 515. The ribbon cable 586 may include electrical conductors for providing power from the batteries 560 to the control interface printed circuit board 554 and/or the motor printed circuit board 592. The ribbon cable 586 may include electrical conductors for conducting control signals (e.g., for transmitting one or more messages) between the control interface printed circuit board 554 and the motor printed circuit board 596. For example, the ribbon cable 586 may be configured to conduct power and/or control signals between the control interface printed circuit board 554 and the motor printed circuit board 592.

FIG. 3B is a side view of an idler end of the example battery-powered motorized window treatment 500. The battery-powered motorized window treatment 500 may include an idler shaft 514 and an idler coupler 543. The idler shaft 514 may be configured to support an idler end 511 of the battery-powered motorized window treatment. The idler shaft 514 may remain stationary as the roller tube 510 rotates. The battery-powered motorized window treatment 500 may include idler bearings 544. The idler bearings 544 may be configured to support the roller tube 510 while enabling the roller tube 510 to rotate about the idler shaft 514. The idler coupler 543 may be configured to operatively couple the roller tube 510 to the idler bearings 544.

The battery-powered motorized window treatment 500 may include a spring assist assembly 516 (e.g., a torsion spring assembly). The spring assist assembly 516 may include a spring 517 (e.g., a torsion spring), a bracket coupling portion 518, and a roller tube coupling portion 508. The bracket coupling portion 518 may be attached to the idler shaft 514 (e.g., the idler arm 513) such that the bracket coupling portion 518 remains stationary as the roller tube 510 rotates. The roller tube coupling portion 508 may be operatively coupled to the roller tube 510 (e.g., the splines 512) such that the roller tube coupling portion 508 rotates with the roller tube 510. The spring 517 may be attached to the bracket coupling portion 518 at one end and to the roller tube coupling portion 508 at the other end. The spring 517 may be configured to coil and uncoil as the roller tube 510 rotates (e.g., depending on the direction of rotation). For example, the torque applied by the spring 517 to the roller tube 510 may change as the roller tube rotates.

The spring assist assembly 516 may be configured to assist the motor drive unit 590 to operate the battery-powered motorized window treatment 500. For example, the spring assist assembly 516 may reduce the torque required from the motor drive unit 590 to raise and/or lower the covering material of the battery-powered motorized window treatment 500. The spring assist assembly 516 may prolong the life of the batteries 560, for example, by assisting the motor drive unit 590. The spring assist assembly 516 may be coupled to the roller tube 510 for providing a constant torque on the roller tube 510 in a direction opposite a direction of the torque provided on the roller tube 510 by the motor drive unit 590. For example, the spring assist assembly 516 may provide a torque on the roller tube 510 opposite a torque provided by the motor drive unit 590 to raise the covering material to a position approximately midway between the fully-closed and fully-open position without substantial energy being provided by the motor unit 590. The torque applied by the spring assist assembly 516 on the roller tube 510 may increase as the covering material is lowered. This increasing torque applied by the spring assist assembly 516 may balance the increasing torque created be more of the covering material hanging from the roller tube 510. The balance between the torque applied by the spring assist assembly 516 and the torque applied by the covering material may result in a substantially constant torque on the motor drive unit 590. For example, the spring assist assembly 516 may be configured such that the motor drive unit 590 can operate at a substantially constant torque as the covering material is raised and lowered (e.g., operated between a raised position and a lowered position).

The spring assist assembly 516 may assist the motor drive unit 590 when raising the covering material above the midway position to the fully-open position, and the spring assist assembly 516 may provide a torque on the drive shaft resisting downward motion of the covering material when the covering material is lowered from the fully-open position to the fully-closed position. The motor drive unit 590 may provide a torque that is configured to wind up the spring assist assembly 516 when the covering material is lowered from the midway position to the fully-closed position.

When the roller tube 510 is mounted using two brackets 530, 531 that may be translated into the extended position, the spring assist assembly 516 may be configured to be adjusted (e.g., pre-wound) at the installation site (e.g., when the roller tube 510 is mounted to the mounting brackets 530, 531). Pre-winding the spring assist assembly 516 may enable the spring assembly 516 to provide a constant torque on the roller tube 510 during operation of the motor drive unit 590. Pre-winding the spring assist assembly 516 at the installation site may eliminate the need to pre-wind the spring assist assembly 516 during manufacturing (e.g., at the factory). Pre-winding the spring assist assembly 516 during manufacturing may result in pre-winding in the wrong direction, too many turns, and/or not enough turns for the application. Pre-winding the spring assist assembly 516 during manufacturing may require a locking mechanism to hold the roller tube 510 such that the pre-wound spring assist assembly 516 does not unwind. Pre-winding the spring assist assembly 516 at the installation site may allow for more precise pre-winding settings, eliminate factory pre-winding errors, and eliminate the need for a locking mechanism to hold the roller tube 510 in place prior to installation.

Motorized window treatments tend to be operated intermittently throughout the day. Motorized window treatments may draw high peak currents for a short amount of time to drive the motor to move the position of the covering material, followed by long periods of nearly zero current whilst the shade is stationary. As such, motorized window treatments can be considered "peaky loads"—loads that draw high peaks of current for relatively short periods of time and relatively infrequently throughout the day. Further, some motorized window treatments use batteries (e.g., traditional alkaline batteries) as a power source to power the motor that moves the covering material. Typically, the motors of such motorized window treatments are driven directly from the battery voltage of the batteries. While the motor is being driven to move the covering material of the motorized window treatment, the motor draws a large amount of current for a short duration of time from the batteries thus causing the amount of energy stored within the batteries to decrease. However, there is a non-linear relationship between the current drawn (e.g., the peak current drawn) from the batteries and the amount of energy (Joules) available from the batteries (e.g., and the expected lifetime of the batteries). For instance, if batteries supply power at a relatively high peak current, the total energy level of the batteries may decrease faster and the battery lifetime may be shorter than if system is configured to supply power from the batteries at a relatively low current (e.g., the batteries may drain faster when the current drawn is higher, and the batteries may drain slower when the current drawn is lower). Accordingly, directly driving the motor of a motorized window treatment from the batteries with high peak currents, as in prior art motorized window treatments, may be suboptimal for the lifetime performance of the batteries.

Further, infrastructure and existing devices are traditionally designed to handle the peak power conditions. But, in instances where the load is one that draws high peaks of current for relatively short periods of time and relatively infrequently throughout the day (e.g., a "peaky load"), the infrastructure and/or devices that support such loads may sit idle for the vast majority of the day (e.g., over 90% of the time). This results in a higher overall cost to manufacture and maintain the system since the infrastructure and/or devices are designed to handle the peak power conditions, which are infrequently required.

The motorized window treatment described herein may be configured to decouple the power and time of the infrequent, high peak current demands of such loads. For example, the motorized window treatments described herein may be configured to cause the batteries to supply power at a relatively small current for a long duration of time. The motorized window treatments may include an internal energy storage element (e.g., a supercapacitor, a rechargeable battery, or a lithium battery) and circuitry for limiting the current drawn from the batteries, such that a small constant current (e.g. a desired average current) may be drawn from the batteries over a long period of time to prolong the lifetime of the batteries. For example, the motorized window treatments described herein may be configured to reduce the peak current drawn from the batteries, for example, by charging the internal energy storage element slowly over time (e.g., thereby reducing the peak current drawn over a short period of time from the batteries) and then powering the load (e.g., motor) using the energy stored within the internal energy storage element. Accordingly, the motorized window treatments described herein may utilize the internal energy storage element to draw a small constant current from the batteries over a long period of time to extend the lifetime (e.g., and increase the total energy output) of the batteries, reduce the peak current and/or voltage draws from the batteries, and/or reduce the likelihood of battery failures.

The batteries may be referred to as primary batteries, while the energy storage element may be referred to as a secondary battery. The primary batteries may be replaceable by the user, for example, when they fall below a threshold energy level. The primary batteries may, for example, be alkaline batteries, such as those that are available off-the-shelf. The energy storage element, or secondary battery, may be a semi-permanent power source of the device. For example, the energy storage element may be a commercial power source, such as one or more lithium batteries or supercapacitors. The energy storage element may be integrated into the device and not intended for the user to remove or replace (e.g., outside of rare exceptions where, for example, a technician may service the device). As noted, the primary batteries may be comprised of a different battery chemistry than that of the energy storage element. Further, in some examples, the batteries may have an internal resistance that is multiple factors (e.g., 10 times) greater than the internal resistance of the energy storage element. As an example, the batteries may be characterized by a voltage drop of at least 0.2 V in response to a draw of 0.5 W, and the energy storage element may be characterized by a voltage drop of no more than 0.04 V in response to a draw of 0.5 W. Further, in some examples, the batteries the batteries (e.g., each battery) may be characterized by a voltage drop in response to a draw of 0.5 W that is at least 10 times larger than a voltage drop of the energy storage element in response to a draw of 0.5 W.

Figure 4:
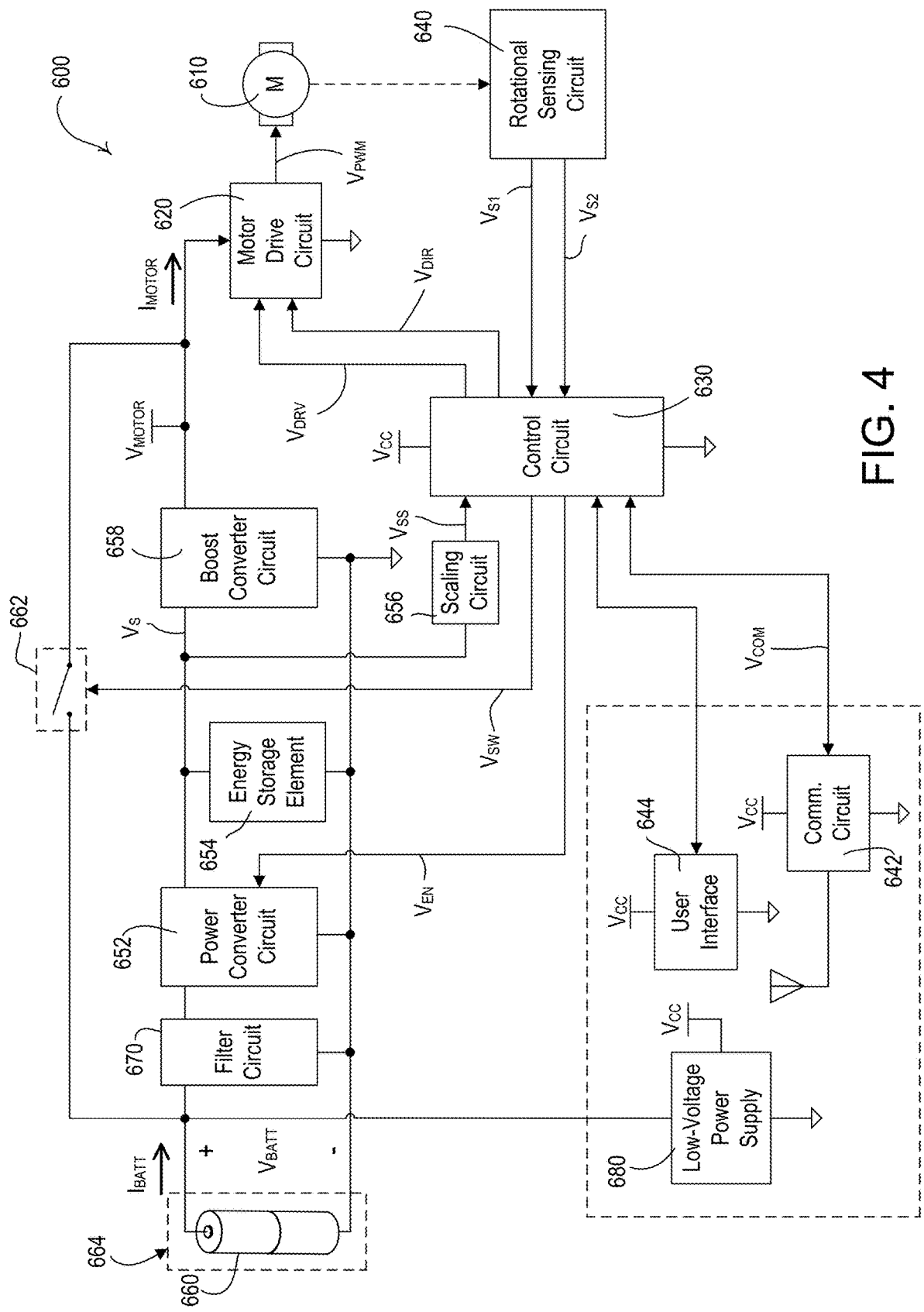
FIG. 4 is a block diagram of an example motor drive unit of a motorized window treatment.

FIG. 4 is a block diagram of an example motor drive unit 600 of a motorized window treatment (e.g., the motor drive unit 590 of the motorized window treatment 500 of FIG. 3A). The motor drive unit 600 may comprise a motor 610 (e.g., a direct-current (DC) motor) that may be coupled for raising and lowering a covering material. For example, the motor 610 may be coupled to a roller tube 510 of the motorized window treatment for rotating the roller tube for raising and lowering a flexible material (e.g., a shade fabric). The motor drive unit 600 may comprise a load control circuit, such as a motor drive circuit 620 (e.g., an H-bridge drive circuit) that may generate a pulse-width modulated (PWM) voltage $V_{PWM}$ for driving the motor 610 (e.g., to move the covering material between a fully-open and fully-closed position). In addition, the control circuit 630 may be configured to generate a direction signal for controlling the direction of rotation of the motor 610.

The motor drive unit 600 may comprise a control circuit 630 for controlling the operation of the motor 610. The control circuit 630 may comprise, for example, a microprocessor, a programmable logic device (PLD), a microcontroller, an application specific integrated circuit (ASIC), a field-programmable gate array (FPGA), or any suitable processing device or control circuit. The control circuit 630 may be configured to generate a drive signal $V_{DRV}$ for controlling the motor drive circuit 620 to control the rotational speed of the motor 610 (e.g. the motor drive circuit 620 receives the drive signal $V_{DRV}$ and controls, for example, an H-bridge circuit with appropriate PWM signals in response to the drive signal). In examples, the drive signal $V_{DRV}$ may comprise a pulse-width modulated signal, and the rotational speed of the motor 610 may be dependent upon a duty cycle of the pulse-width modulated signal. In examples, the control circuit 630 may directly control the motor 610 (e.g. in a configuration with no separate motor drive circuit 620). For example, the control circuit may generate two PWM signals for controlling the duty cycle and the polarity (e.g. controlling the speed and direction) of the motor 610. In addition, the control circuit 630 may be configured to generate a direction signal $V_{DIR}$ for controlling the motor drive circuit 620 to control the direction of rotation of the motor 610. The control circuit 630 may be configured to control the motor 610 to adjust a present position $P_{PRES}$ of the covering material of the motorized window treatment between a fully-open position $P_{OPEN}$ and a fully-closed position $P_{CLOSED}$.

The motor drive unit 600 may include a rotational sensing circuit 640, e.g., a magnetic sensing circuit, such as a Hall effect sensor (HES) circuit, which may be configured to generate two signals $V_{S1}$, $V_{S2}$ (e.g., Hall effect sensor signals) that may indicate the rotational position and direction of rotation of the motor 610. The rotational sensing circuit 640 (e.g., HES circuit) may comprise two internal sensing circuits for generating the respective signals $V_{S1}$, $V_{S2}$ (e.g., HES signals) in response to a magnet that may be attached to a drive shaft of the motor. The magnet may be a circular magnet having alternating north and south pole regions, for example. For example, the magnet may have two opposing north poles and two opposing south poles, such that each sensing circuit of the rotational sensing circuit 640 is passed by two north poles and two south poles during a full rotation of the drive shaft of the motor. Each sensing circuit of the rotational sensing circuit 640 may drive the respective signal $V_{S1}$, $V_{S2}$ to a high state when the sensing circuit is near a north pole of the magnet and to a low state when the sensing circuit is near a south pole. The control circuit 630 may be configured to determine that the motor 610 is rotating in response to the signals $V_{S1}$, $V_{S2}$ generated by the rotational sensing circuit 640. In addition, the control circuit 630 may be configured to determine the rotational position and direction of rotation of the motor 610 in response to the signals $V_{S1}$, $V_{S2}$.

The motor drive unit 600 may include a communication circuit 642 that may allow the control circuit 630 to transmit and receive communication signals, e.g., wired communication signals and/or wireless communication signals, such as radio-frequency (RF) signals. For example, the motor drive unit 600 may be configured to communicate messages (e.g., digital messages) with external control devices (e.g., other motor drive units). The communication circuit 642 may be internal to a housing of the motor drive unit 600. The motor drive unit 600 may also, or alternatively, be coupled to an external RF communication circuit (e.g., located outside of the motor drive unit) for transmitting and/or receiving the RF signals.

The motor drive unit 600 may communicate with one or more input devices, e.g., such as a remote control device, an occupancy sensor, a daylight sensor, and/or a shadow sensor. The remote control device, the occupancy sensor, the daylight sensor, and/or the shadow sensor may be wireless control devices (e.g., RF transmitters) configured to transmit messages to the motor drive unit 600 via the RF signals. For example, the remote control device may be configured to transmit digital messages via the RF signals in response to an actuation of one or more buttons of the remote control device. The occupancy sensor may be configured to transmit messages via the RF signals in response to detection of occupancy and/or vacancy conditions in the space in which the motorized window treatment is installed. The daylight sensor may be configured to transmit digital messages via RF signals in response to a measured amount of light inside of the space in which the motorized window treatment is installed. The shadow sensor may be configured to transmit messages via the RF signals in response to detection of a glare condition outside the space in which the motorized window treatment is installed.

The motorized window treatment may be configured to control the covering material according to a timeclock schedule. The timeclock schedule may be stored in the memory. The timeclock schedule may be defined by a user (e.g., a system administrated through a programming mode). The timeclock schedule may include a number of timeclock events. The timeclock events may have an event time and a corresponding command or preset. The motorized window treatment may be configured to keep track of the present time and/or day. The motorized window treatment may transmit the appropriate command or preset at the respective event time of each timeclock event.

The motor drive unit 600 may further comprise a user interface 644 having one or more actuators (e.g., mechanical switches) that allow a user to provide inputs to the control circuit 630 during setup and configuration of the motorized window treatment (e.g., in response to actuations of one or more buttons (e.g., the control button 152. The control circuit 630 may be configured to control the motor 610 to control the movement of the covering material in response to a shade movement command received from the communication signals received via the communication circuit 642 or the user inputs from the buttons of the user interface 644. The control circuit 620 may be configured to enable (e.g., via the control button 152 and/or the user interface 644) a user to pair the motorized window treatment with a remote control device and/or other external devices to allow for wireless communication between the remote control device and/or other external devices and the communication circuit 642 (e.g., an RF transceiver). The user interface 644 (e.g., the control button 152) may be configured to provide a status indication to a user. For example, user interface 644 (e.g. the control button 152) may be configured to flash and/or change colors to provide the status indication to the user. The status indication may indicate when the motorized window treatment is in a programming mode. The user interface 644 may also comprise a visual display, e.g., one or more light-emitting diodes (LEDs), which may be illuminated by the control circuit 630 to provide feedback to the user of the motorized window treatment system.

The motor drive unit 600 may comprise a memory (not shown) configured to store the present position $P_{PRES}$ of the covering material and/or the limits (e.g., the fully-open position $P_{OPEN}$ and the fully-closed position $P_{CLOSED}$), association information for associations with other devices and/or instructions for controlling the motorized window treatment. The memory may be implemented as an external integrated circuit (IC) or as an internal circuit of the control circuit 630.

The motor drive unit 600 may comprise a compartment 664 (e.g., which may be an example of the battery compartment 211 of the window treatment) that is configured to receive a DC power source. In some examples, the compartment 664 may be internal to the motor drive unit 600. In other examples, the compartment 664 may be external to the motor drive unit 600. In the example shown in FIG. 4, the DC power source is one or more batteries 660. In addition, one or more alternate DC power sources may be coupled in parallel with the one or more batteries 660, or in some examples be used as an alternative to the batteries 660. For example, the alternative DC power sources may comprise one or more of a solar energy receiving circuit (e.g., a solar cell and/or a photovoltaic cell), an ultrasonic energy receiving circuit, and/or a radio-frequency (RF) energy receiving circuit, and other suitable energy harvesting circuits. The alternate DC power source may be used to perform the same and/or similar functions as the one or more batteries 660. In this example, the compartment 664 may be configured to receive one or more batteries 660 (e.g. four "D" batteries), such as the batteries 260, 560 of FIGS. 2A, 2B, 3. The batteries 660 may provide a battery voltage $V_{BATT}$ to the motor drive unit 600. The batteries 660 may be referred to as primary batteries. The batteries 660 may be replaceable by the user, for example, when they fall below a threshold energy level. The batteries 660 may, for example, be alkaline batteries, such as those that are available off-the-shelf.

The motor drive unit 600 may comprise a filter circuit 670, a current limiting circuit, such as a power converter circuit 652, and an energy storage element 654 (e.g., an intermediate energy storage element). In some examples, the motor drive unit 600 may include a second power converter, such as a boost converter circuit 658. Also, in some examples, the second power converter may be omitted from the motor drive circuit 600. The energy storage element 654 may comprise any combination of one or more supercapacitors, one or more rechargeable batteries, and/or other suitable energy storage devices. In some examples, the energy storage element 654 may be referred to as a secondary battery. The energy storage element 654 may be a semi-permanent power source of the motor drive unit 600. For example, the energy storage element 654 may be a commercial power source, such as one or more lithium batteries or supercapacitors. The energy storage element 654 may be integrated into the motor drive unit 600 and not intended for the user to remove or replace (e.g., outside of rare exceptions where, for example, a technician may service the motor drive unit 600). As previously noted, the batteries 660 may be comprised of a different battery chemistry than that of the energy storage element 654. Further, in some examples, the batteries 660 may have an internal resistance that is multiple factors (e.g., 10 times) greater than the internal resistance of the energy storage element 654.

The filter circuit 670 may receive the battery voltage $V_{BATT}$. The power converter circuit 652 may draw a battery current $I_{BATT}$ from the batteries 660 through the filter circuit 670. The filter circuit 670 may filter high and/or low frequency components of the battery current $I_{BATT}$. In some examples, the filter circuit 670 may be a low-pass filter. Also, in some examples, the filter circuit 670 may be omitted from the motor drive circuit 600.

The power converter circuit 652 may be configured to limit the current drawn from the batteries 660 (e.g. allowing a small constant current to flow from the batteries 660). The power converter circuit 652 may receive the battery voltage $V_{BATT}$ (e.g. $V_{IN}$) via the filter circuit 670. In some examples, the power converter circuit 652 may comprise a step-down power converter, such as a buck converter. The power converter circuit 652 may be configured to charge the energy storage element 654 from the battery voltage $V_{BATT}$ to produce a storage voltage $V_S$ across the energy storage element 654 (e.g., approximately 3.5 volts). The motor drive circuit 620 may draw energy from the energy storage element 654 (e.g., via the boost converter circuit 658) to drive the motor 610. As such, the power converter circuit 652 may be configured to limit the current drawn from the batteries 660, for example, by producing a storage voltage $V_S$ and driving the motor 610 using the storage voltage $V_S$ stored across the energy storage element 654. In most cases, for instance, the motor drive circuit 620 may drive the motor 610 by drawing current from the energy storage element 654 and not drawing any current directly from the batteries 660. The power converter circuit 652 (e.g., the control circuit 630 controlling the power converter circuit 652) may control the current drawn from the batteries 660 (e.g., the battery current) such that an open-circuit battery voltage of the batteries 660 reduces by no more than a set percentage, for example, reduces by no more than the set percentage when power is delivered to the motor 610 to control movement of the covering material and/or for a period of time immediately before or after the movement of the covering material. The set percentage may be 10%, or preferably 5%, or more preferably 3%. By preventing large voltage drops, the power converter circuit 652 (e.g., and/or the control circuit 630) can elongate the useful life of the batteries 660 for providing energy to power the motor 610. Finally, it should be appreciated that, in some examples, the power converter circuit 652 may be omitted for another current limiting circuit, such as in instances where the battery voltage $V_{BATT}$ is the same as the storage voltage $V_S$ and power conversion (e.g., a step-up or step-down) is not needed to drive the motor.

The motor drive unit 600 may be configured to control when and how the energy storage element 354 charges from the batteries 660. The control circuit 630 may control when and how the energy storage element 354 charges from the batteries 660 based on the storage voltage $V_S$ of the energy storage element 654, such as when the storage voltage $V_S$ of the energy storage element 654 falls below a low-side threshold value (e.g., approximately 2.8 volts). For example, the control circuit 630 may be configured to receive a scaled storage voltage $V_{SS}$ through a scaling circuit 656 (e.g., a resistive divider circuit). The scaling circuit 656 may receive the storage voltage $V_S$ and may generate the scaled storage voltage $V_{SS}$. The control circuit 630 may determine the magnitude of the storage voltage $V_S$ of the energy storage element 654 based on the magnitude of the scaled storage voltage $V_{SS}$. When the control circuit 630 determines that the magnitude of the storage voltage $V_S$ of the energy storage element 654 falls below the low-side threshold value, the control circuit 630 may control a charging enable signal $V_{EN}$ (e.g., drive the charging enable control signal $V_{EN}$ high) to enable the power converter circuit 652. When the power converter circuit is enabled, the power converter circuit 652 may be configured to charge the energy storage element 654 (e.g. from the batteries 660). When the power converter circuit is disabled, the power converter circuit 652 may be configured to cease charging the energy storage element 654 (e.g. from the batteries 660).

The motor drive unit 600 may utilize the energy storage element 654 to draw a small constant current from the batteries 660 over a long period of time to extend the lifetime (e.g., and increase the total energy output) of the batteries 660. For example, the motor drive unit 600 (e.g., the power converter circuit 652 and/or the motor drive circuit 620) may limit the current drawn by the power converter circuit 652. The motor drive unit 600 may draw current from the batteries 660 that is less than the limit, but not more. Further, as noted, the motor drive unit 600 may control the current drawn from the batteries 660 (e.g., the battery current) such that an open-circuit battery voltage of the batteries 660 reduces by no more than a set percentage (e.g., 10%, 5%, or 3%) during any instance of power draw from the batteries, for example, when power is delivered to the motor 610 to control movement of the covering material and/or for a period of time immediately before or after the movement of the covering material. The batteries 660 may eventually experience a voltage drop that exceeds the set percentage, but may only do so over an extended period of time (e.g., multiple years, such as 5 year, 10 years, or more, based on how often the window treatment is used).

When enabled, the power converter circuit 652 may be configured to conduct an average current $I_{AVE}$ (e.g., having a magnitude of approximately 15 milliamps) from the batteries 660. The magnitude of the average current $I_{AVE}$ may be much smaller than a magnitude of a drive current, such as a motor current $I_{MOTOR}$ required by the motor drive circuit 620 to rotate the motor 610. When the motor drive circuit 620 is driving the motor 610, the magnitude of the storage voltage $V_S$ of the energy storage element 654 may decrease with respect to time. When the motor drive circuit 620 is not driving the motor 610 and the power converter circuit 652 is charging the energy storage element 654, the magnitude of the storage voltage $V_S$ may increase (e.g., slowly increase). When the storage voltage $V_S$ of the energy storage element 654 falls below a low-side threshold value (e.g. approximately 2.8V), the control circuit 630 may enable the power converter circuit to begin charging the energy storage element. The storage voltage $V_S$ may fall below the low-side threshold value after powering movements of the covering material, powering low-voltage components, and/or due to leakage currents over time. When the storage voltage $V_S$ of the energy storage element 654 rises above a high-side threshold value (e.g., approximately 3.5 volts), the control circuit 630 may cease driving the charging enable signal $V_{EN}$ high to disable the power converter circuit 652 and stop the charging of the energy storage element 654 from the batteries 660.

The motor drive unit 600 may further comprise the boost converter circuit 658 that receives the storage voltage $V_S$ and generates a motor voltage $V_{MOTOR}$ (e.g., approximately 5 volts) for powering the motor 610. The motor voltage $V_{MOTOR}$ may be larger than the storage voltage $V_S$. In some examples, a switch (e.g., a single pole double throw switch) may connect the batteries 660 and the energy storage element 654 to the boost converter 658 (e.g., if the required motor voltage level exceeds the present battery voltage $V_{BAT}$). When the control circuit 630 controls the motor drive circuit 620 to rotate the motor 610, the boost converter circuit 658 may conduct current from the energy storage element 654 to generate the motor voltage $V_{MOTOR}$. As noted above, in some examples, the motor drive unit 600 may not include the boost converter circuit 658, for example, based on the voltage requirements of the motor 610.

The motor drive unit 600 may also comprise a controllable switching circuit 662 coupled between the batteries 660 and the motor drive circuit 620. The control circuit 630 may generate a switch control signal $V_{SW}$ for rendering the controllable switching circuit 662 conductive and non-conductive. The control circuit 630 may be configured to render the controllable switching circuit 662 conductive to bypass the filter circuit 670, the power converter circuit 652, the energy storage element 654, and/or the boost converter circuit 658 to allow the motor drive circuit 620 to draw current directly from the batteries 660 (e.g., when the energy storage element 654 is depleted). For example, the control circuit 630 may render the controllable switching circuit 662 conductive when the control circuit 630 determines that the magnitude of the storage voltage $V_S$ of the energy storage element 654 (e.g., based on the magnitude of the scaled storage voltage $V_{SS}$) is depleted below a threshold and the control circuit 630 has received an input or command to operate the motor 610 and, for example, does not have enough energy to complete a movement or an amount of movement of the covering material). For example, the control circuit may determine if the energy storage element 654 has enough energy to complete a movement or an amount of movement of the covering material by comparing a present storage level of the energy storage element 654 (e.g., the storage voltage $V_S$) to a threshold. The threshold may indicate a storage level sufficient to complete a full movement of the covering material from the fully-closed position to the fully-open position (e.g., a fixed threshold).

The threshold may be constant or may vary, for example, depending on the amount of movement of the covering material required by the received command, such that the threshold (e.g., a variable threshold) may indicate a storage level sufficient to complete the movement required by the received command.

If the energy storage element 654 is not sufficiently charged (e.g., does not have enough energy to move the covering material), the control circuit may close the controllable switching circuit 662 to allow the electrical load (e.g., the motor) to draw current directly from the batteries. Closing the controllable switching circuit 662 may bypass the energy storage element 654, such that the stored energy of the energy storage element 654 is not used for driving the motor 610 to move the covering material.

As described in more detail herein, the control circuit 630 may operate in different modes, such as a first mode where the motor drive circuit 620 draws a battery current from the batteries 660 (e.g., directly from the batteries) to control the power delivered to the motor 610 to control movement of the covering material, and operate in a second mode where the motor drive circuit 620 draws the current from the energy storage element 654 to control the power delivered to the motor 610 to control movement of the covering material. The control circuit 630 may render the controllable switching circuit 662 conductive to operate in the first mode, and render the controllable switching circuit 662 non-conductive to operate in the second mode. In some examples, the control circuit 630 may operate in the first mode until the battery voltage $V_{BATT}$ (e.g., the open-circuit battery voltage of the batteries) falls below a threshold voltage $V_{TH}$ (e.g., 1.4 V). After the battery voltage $V_{BATT}$ falls below the threshold voltage $V_{TH}$, the control circuit 630 may render the controllable switching circuit 662 non-conductive to operate in the second mode to cause the motor drive circuit 620 to draw the current from the energy storage element 654 to control the power delivered to the motor 610 to control movement of the covering material. By operating in the second mode after the battery voltage $V_{BATT}$ falls below the threshold voltage $V_{TH}$, the control circuit 630 may, for example, allow for more energy to be depleted out of the batteries for use to control the motor 610 by drawing the current out of the batteries 660 at a voltage level that is less than what is required to drive the motor 610 (e.g., and also leverage the higher voltage potential (e.g., reduced voltage drop) provided by the energy storage element 654).

Alternatively or additionally, the control circuit 630 may be configured to switch between the modes during operations of the motor 610 (e.g., during movements of the covering material between positions). For instance, the control circuit 630 may operate in the second mode when the motor current $I_{MOTOR}$ required by the motor drive circuit 620 to rotate the motor 610 is above a current threshold (e.g., 50-500 mA), and may operate in the first mode (e.g., switch to the first mode) when the motor current $I_{MOTOR}$ required by the motor drive circuit 620 to rotate the motor 610 is below the current threshold. An example of when this might occur is during the movement of the covering material between a fully-closed position to a fully-open position where the power, and in turn the motor current $I_{MOTOR}$, needed to drive the motor 610 might be above the current threshold for at least the initial movement of the covering material, but when the covering material is close to the fully-open position, the motor current $I_{MOTOR}$ may reduce below the current threshold and the control circuit 630 may operate in the first mode to drive the motor 610 from the batteries 660 (e.g., directly from the batteries 660). In some examples, the motor current $I_{MOTOR}$ may cross the current threshold during some, but not all movements of the covering material.

The motor drive unit 600 may comprise a low-voltage power supply 680. The low-voltage power supply 680 may receive the battery voltage $V_{BATT}$. The low-voltage power supply 680 may be configured to produce a low-voltage supply voltage $V_{CC}$ (e.g., approximately 3.3 volts) for powering low-voltage circuitry of the motor drive unit 600, such as the user interface 644, the communication circuit 642, and the control circuit 630. Further, in some examples, the low-voltage power supply 680 may be omitted from the motor drive unit 600 (e.g. if the low-voltage circuitry of the motor drive unit 600 is able to be powered directly from the storage voltage $V_S$). Additionally or alternatively, the motor drive unit 600 may comprise a low-voltage power supply (not shown) that may receive the storage voltage $V_S$ and generate the low voltage $V_{CC}$ (e.g., approximately 3.3 V) for powering the control circuit 630 and other low-voltage circuitry of the motor drive unit 600, e.g., the user interface 644, the communication circuit 642, and the control circuit 630.

Figure 5:
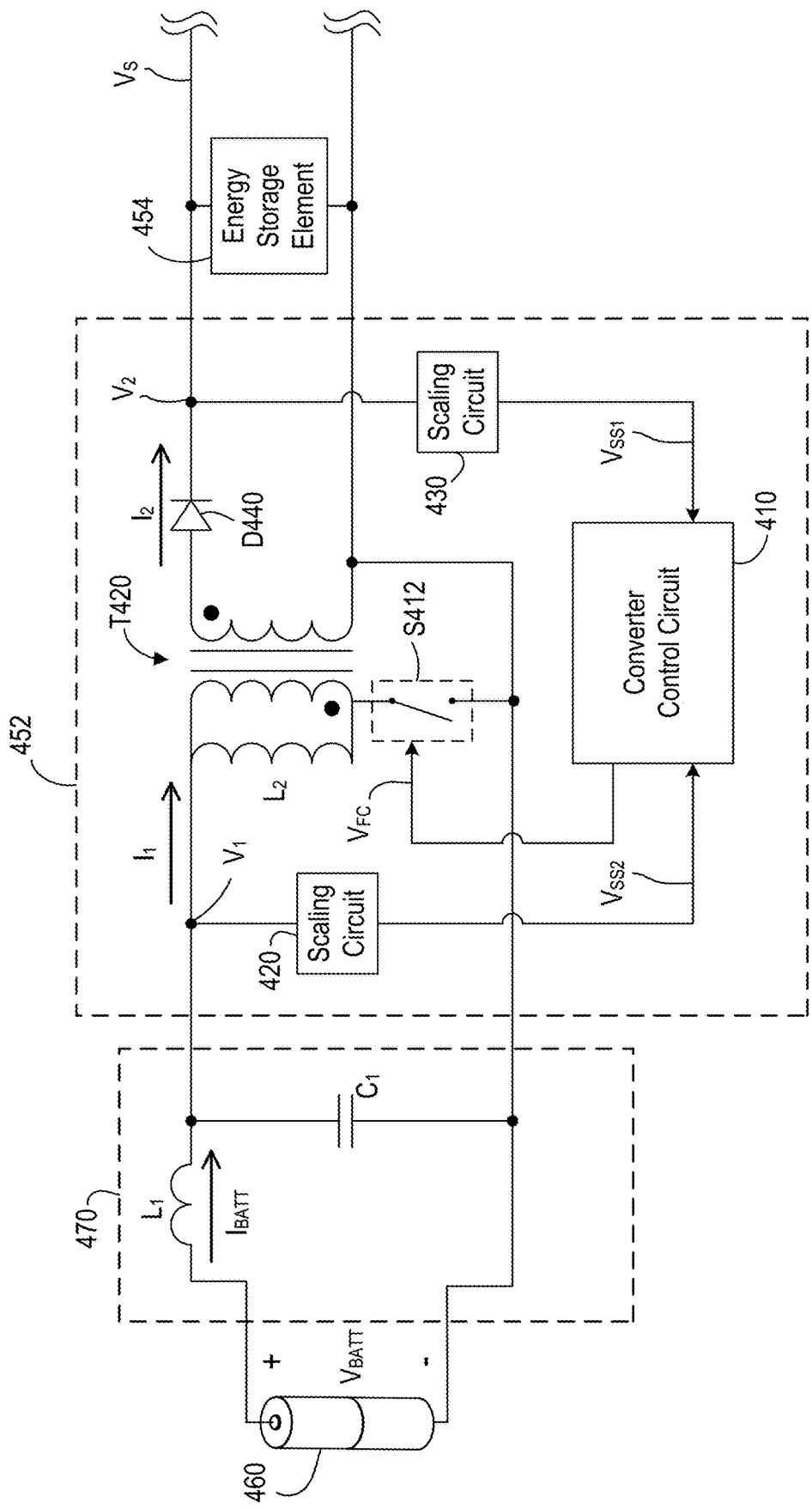
FIG. 5 is a block diagram of an example energy storage element and power converter.
Figure 6:
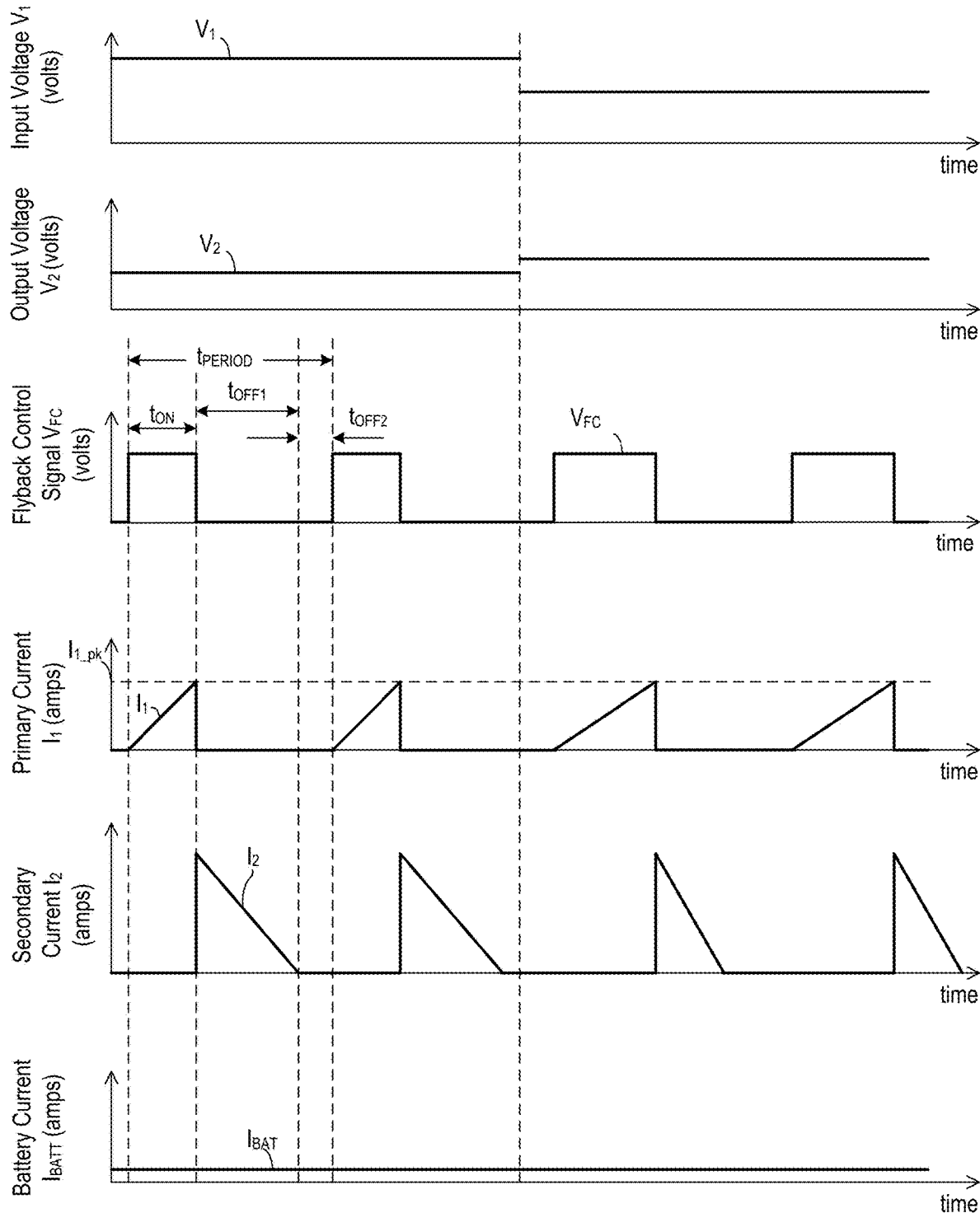
FIG. 6 is an example of waveforms that illustrate an operation of an energy storage element, power converter, and filter.

FIG. 5 is a block diagram of an example filter circuit 470 and an example power converter circuit 452 for charging an energy storage element 454 from one or more batteries 460. For example, the filter circuit 470 and the power converter circuit 452 may be configured for use in the motor drive unit 600 of FIG. 4, such that the power converter circuit 452, the filter circuit 470, the energy storage element 454, and the batteries 460 may be examples of the power converter circuit 652, the filter circuit 670, the energy storage element 654, and the batteries 660, respectively. FIG. 6 is an example of waveforms that illustrate an operation of an energy storage element, power converter circuit, and filter, such as the power converter circuit 452 and the filter circuit 470.

The filter circuit 470 may comprise an inductor $L_1$ and a capacitor Ci. The filter circuit 470 may be a low-pass filter. The filter circuit 470 may receive a battery voltage $V_{BATT}$ from the batteries 460. The power converter circuit 452 may draw a battery current $I_{BATT}$ from the batteries 460 through the filter circuit 470. The filter circuit 470 may filter high and/or low frequency components of the battery current $I_{BATT}$ and/or the battery voltage $V_{BATT}$. For instance, the filter circuit 470 may smooth primary current $I_1$ conducted by a primary winding of a transformer T420 to generate a low-ripple battery current $I_{BATT}$ (e.g., smooth out the average battery current $I_{BATT}$, for example as shown in FIG. 6). It should be appreciated that, in some examples, the filter circuit 470 may be omitted from the motor drive circuit (e.g., the motor drive circuit 600).

The power converter circuit 452 may include a converter control circuit 410, a transformer T420, a switch S412, and scaling circuits 420, 430. As shown in FIG. 5, the power converter circuit 452 may comprise, for example, a flyback converter circuit. The transformer T420 may be characterized by a turns ratio of N:1. The input of the power converter 452 may be coupled to the batteries 460 through the filter circuit 470. The output of the power converter circuit 452 may be coupled to the energy storage element 454. The power converter circuit 452 may receive the battery voltage $V_{BATT}$ through the filter circuit 470. The power converter circuit 452 may be configured to conduct the battery current $I_{BATT}$ from the batteries 460 to charge the energy storage element 654 and produce a storage voltage $V_S$ across the energy storage element 454. For example, the energy storage element 454 may comprise one or more supercapacitors, rechargeable batteries, and/or other suitable energy storage devices. As illustrated in FIG. 5, the converter control circuit 410 may be a dedicated control circuit for the power converter circuit 452. The converter control circuit 410 may comprise, for example, a microprocessor, a programmable logic device (PLD), a microcontroller, an application specific integrated circuit (ASIC), a field-programmable gate array (FPGA), or any suitable processing device or control circuit. In some examples, the functions of the converter control circuit 410 may be handled by another control circuit, such as a control circuit for the entire motor drive unit (e.g., the control circuit 630 of the motor drive unit 600 of FIG. 4).

The converter control circuit 410 may operate to reduce the magnitude (e.g., the average magnitude) of the battery current $I_{BATT}$ drawn from the batteries 460 while maintaining the operation of the power converter circuit 452 in discontinuous conduction mode. The converter control circuit 410 may determine a desired average current $I_{AVE}$ (e.g. $I_{IN}$) to be drawn from the batteries 460 and a duty cycle for controlling the power converter circuit 452. In examples the current limit of the power converter circuit may define an upper bound of the battery current $I_{BATT}$. For example, the converter control circuit 410 may determine the desired average current $I_{AVE}$ drawn from the batteries 460. Based on the desired average current $I_{AVE}$ and the goal of maintaining operation in discontinuous mode, the converter control circuit 410 may control a duty cycle of the power converter circuit 452 (e.g., by controlling an on-time torr and an operating period $t_{PERIOD}$ of the power converter circuit).

The converter control circuit 410 may be configured to determine the magnitude of an input voltage $V_1$ of the power converter circuit 452 and the magnitude of an output voltage $V_2$ of the power converter circuit 452 (e.g., the supply voltage $V_S$). The converter control circuit 410 may receive a first scaled storage voltage $V_{SS1}$ through the scaling circuit 420, and may receive a second scaled voltage $V_{SS2}$ through the scaling circuit 430 (e.g., which may be an example of the scaling circuit 656). The converter control circuit 410 may be configured to determine the magnitude of the input voltage $V_1$ in response to the magnitude of the first scaled storage voltage $V_{SS1}$, and to determine the magnitude of the output voltage $V_2$ (e.g., the storage voltage $V_S$) in response to the magnitude of the second scaled storage voltage $V_{SS2}$ (e.g., which may be an example of the motor drive unit scaled voltage $V_{SS}$).

The converter control circuit 410 may be configured to control (e.g., enable and disable) the power converter circuit 452, using the switch S412 (e.g., a semiconductor switch such as a FET), to control the magnitude of the battery current $I_{BATT}$ drawn from the batteries 460 (e.g., towards the average current $I_{AVE}$). The converter control circuit 410 may render the switch S412 conductive for an on-time $t_{ON}$ and non-conductive for an off-time $t_{OFF}$, such that the power converter circuit 452 operates at an operating period $t_{PERIOD}$ (e.g., $t_{PERIOD}=t_{ON}+t_{OFF}$). The converter control circuit 410 may generate a flyback control signal $V_{FC}$ (e.g., a drive voltage) for rendering the switch S412 conductive and non-conductive. The converter control circuit 410 may determine the on-time $t_{ON}$ and the operating period $t_{PERIOD}$ for the flyback control signal $V_{FC}$ based on the desired average current $I_{AVE}$ to be drawn from the batteries 460 and to ensure that the power converter circuit 452 operates in discontinuous conduction mode. For example, the converter control circuit 410 may determine the on-time $t_{ON}$ and the operating period $t_{PERIOD}$ using on the received scaled storage voltages $V_{SS1}$ and $V_{SS2}$. The converter control circuit 410 may render the switch S412 conductive and non-conductive based in whole or in part on the duty cycle, the on-time $t_{ON}$, the operating period $t_{PERIOD}$, the received scaled storage voltages $V_{SS1}$ and $V_{SS2}$, the desired average current $I_{AVE}$, or any combination thereof.

The converter control circuit 410 may render the switch S412 conductive by controlling the flyback control signal $V_{FC}$ to be high for the on-time $t_{ON}$. During the on-time $t_{ON}$, a primary winding of the transformer T420 may be configured to conduct a primary current $I_1$ thus charging a magnetizing inductance $L_2$ of the transformer T420. For example, while the switch S412 is conductive during the on-time $t_{ON}$, the magnitude of the primary current $I_1$ may rise with respect to time (e.g., linearly) until, for example, the end of the on-time $t_{ON}$. The magnitude of the primary current $I_1$ may reach a peak magnitude $I_{1\_pk}$ at the end of the on-time $t_{ON}$. At the end of the on-time $t_{ON}$, the converter control circuit may drive the flyback control signal $V_{FC}$ low thereby rendering the switch 412 non-conductive. A secondary winding of the transformer T420 may conduct a secondary current $I_2$ (e.g., a charging current) through a diode D440 to charge the energy storage element 454 during a first portion of the off-time, $t_{OFF1}$. The secondary current $I_2$ may begin at a peak magnitude and decrease with respect to time (e.g., linearly) until the magnitude reaches zero amps at the conclusion of the first portion of the off-time, $t_{OFF1}$. At the end of the first portion of the off-time, $t_{OFF1}$, the control circuit may maintain the switch S412 non-conductive for a second portion of the off-time, $t_{OFF2}$ (e.g., a dead time). The control circuit 410 may provide (e.g., determine) the second portion of the off-time, $t_{OFF2}$ to maintain the operation of the power converter 452 in discontinuous conduction mode. At the end of the second portion of the off-time, $t_{OFF2}$, the control circuit 410 may start another operating period and drive the flyback control signal $V_{FC}$ high to render the switch S412 conductive for the on-time $t_{ON}$ of the next operating period $t_{PERIOD}$. The control circuit 410 may drive the flyback control signal $V_{FC}$ low to render the switch 2412 non-conductive for the duration of the off-time $t_{OFF1}+t_{OFF2}$. Accordingly, the converter control circuit 410 may set the on-time $t_{ON}$ and the operating period $t_{PERIOD}$ (e.g., to set the second portion of the off-time, $t_{OFF2}$) to ensure that the power converter 452 operates in a manner to ensure the desired low average current $I_{AVE}$ (e.g., approximately 15 milliamps) may be drawn from the batteries 460 to extend the lifetime of the batteries 460, while also maintaining operation of the power converter 452 in discontinuous conduction mode.

It should be appreciated that the magnitude of the input voltage $V_1$ may vary with time (e.g., over the lifetime of the batteries 460 or upon installation of new batteries). Further, the magnitude of the storage voltage $V_S$ may vary with time, for example, based on the operation of the power converter circuit 452 (e.g., the manner in which the switch S412 is driven), or as the energy storage element 454 charges and discharges. The lengths of the on-time $t_{ON}$ and the operating period $t_{PERIOD}$ may be determined based on changes to the magnitude of the input voltage $V_1$ and the output voltage $V_2$ (e.g., and may vary because of the changes to the magnitude of the input voltage $V_1$ and the output voltage $V_2$). The control circuit may set the length of the operating period $t_{PERIOD}$ based on the on-time $t_{ON}$ and the first portion of the off-time $t_{OFF}$ using a scaling factor α, e.g., $$t_{PERIOD}=\alpha\cdot(t_{ON}+t_{OFF1})=(t_{ON}+t_{OFF1}+t_{OFF2}). \quad \text{(Equation 1)}$$

For example, the scaling factor α may be a constant value that is set is to be greater than one, such that the magnitude of the secondary current $I_2$ may always reach zero amps prior to the end of the operating period $t_{PERIOD}$ and the power converter circuit 452 may operate in the discontinuous conduction mode. The operating period may be regarded as the duration of the combination of the on-time $t_{ON}$ and the off-time (e.g., $t_{OFF}=t_{OFF1}+t_{OFF2}$). The on-time $t_{ON}$ may be determined such that it is proportional to a ratio where the inductance $L_2$ is multiplied by the desired average current $I_{AVE}$ divided by the current voltage $V_1$. The on-time $t_{ON}$ may be determined (e.g., calculated) based on the magnitude of the input voltage $V_1$, the magnitude of the output voltage $V_2$, the desired average current $I_{AVE}$, the magnetizing inductance $L_2$ of the transformer T420 and/or the scaling factor α, e.g., $$t_{ON}=(2 \cdot I_{AVE} \cdot L_2 \cdot \alpha \cdot [N \cdot V_2+V_1])/(N \cdot V_1 \cdot V_2). \quad \text{(Equation 2)}$$

The first portion of off-time $t_{OFF1}$ may vary with time based on the peak magnitude $I_{1\_pk}$, the magnetizing inductance $L_2$ of the transformer T420, the turns ratio N:1 of the transformer T420, and the magnitude of the output voltage $V_2$. For example, the operating period $t_{PERIOD}$ may be determined (e.g., calculated) based on the magnitude of the input voltage $V_1$, the magnitude of the output voltage $V_2$, the desired average current $I_{AVE}$, and/or the scaling factor α, e.g., $$t_{PERIOD}=(2 \cdot I_{AVE} \cdot L_2 \cdot \alpha^2 \cdot [N \cdot V_2+V_1]^2)/(V_1 \cdot [N \cdot V_2]^2). \quad \text{(Equation 3)}$$

The control circuit may be configured to periodically adjust the on-time $t_{ON}$ and the operating period $t_{PERIOD}$ at an interval that is greater than the operating period $t_{PERIOD}$ of the power converter circuit. For example, the interval may be approximately one second when the energy storage element 454 comprises one or more supercapacitors, and approximately one minute when the energy storage element 454 comprises one or more rechargeable batteries.

Figure 7:
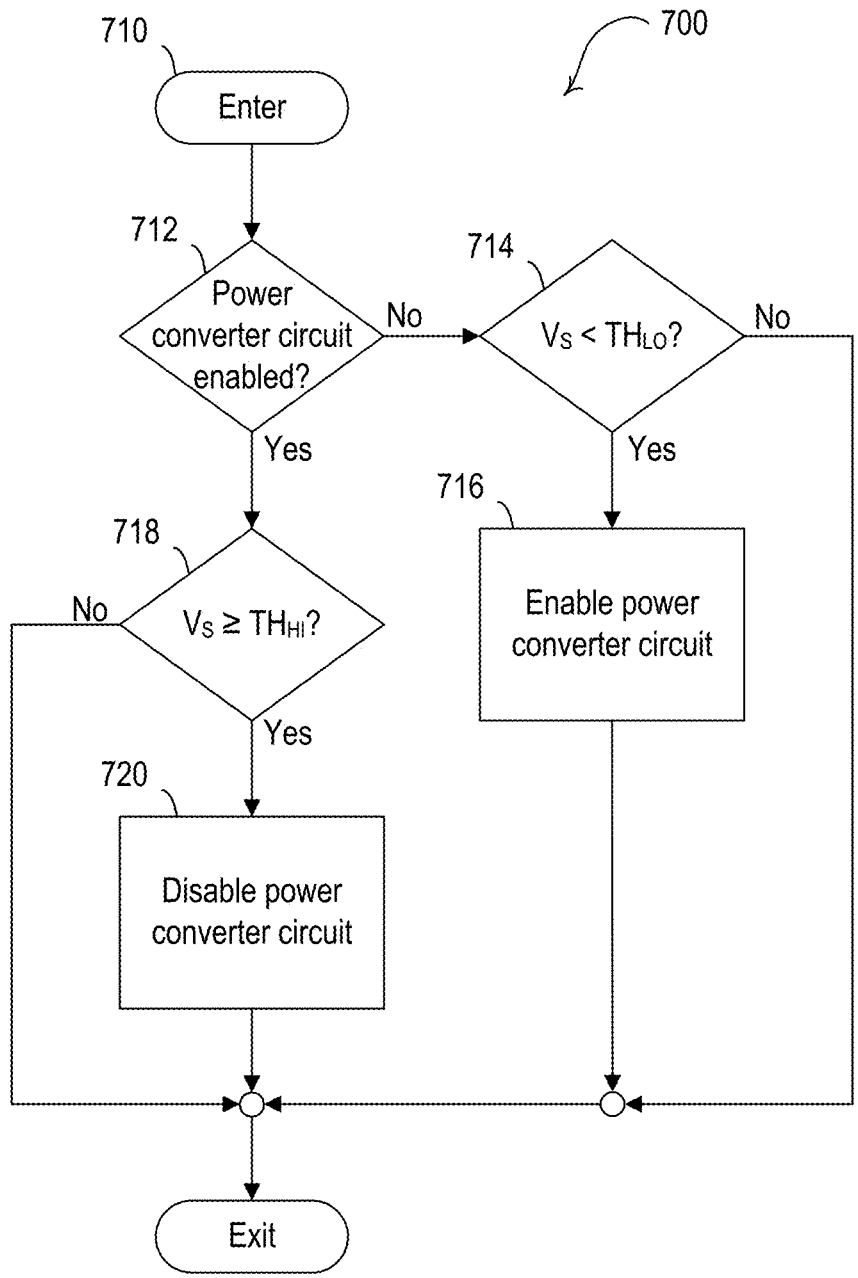
FIG. 7 is an example flowchart of a control procedure for charging an energy storage element that may be executed by a control circuit.

FIG. 7 is a flowchart of an example procedure 700 for charging an energy storage element (e.g., the energy storage element 454, 654). The procedure 700 may be executed by a control circuit of a control device, for example, the converter control circuit 410 and/or the control circuit 630. The procedure 700 may be used to enable or disable a power converter circuit (e.g., the power converter circuit 452, 652), such that the power converter circuit may selectively charge the energy storage element from one or more batteries (e.g., the batteries 460, 660). The procedure 700 may ensure that the energy storage element begins charging (e.g., the power converter circuit begins drawing current from the batteries) when the energy storage element has discharged to a level where it may not have sufficient charge. The procedure 700 may ensure that the power converter circuit discontinues charging once the energy storage element has been charged to a sufficient level. The charging may occur at a rate such that the energy storage element draws a desired average current over time from the batteries, where the desired average current is below a threshold and/or is sufficiently low (e.g., approximately 15 milliamps) that a battery or batteries the energy storage element draws energy from may have an extended lifetime.

The control circuit may execute (e.g., periodically execute) the control procedure 700 at 710. At 712, the control circuit may determine whether the power converter circuit is enabled (e.g. if the power converter circuit is presently charging the energy storage element). If the power converter circuit is not enabled, the control circuit may determine if the magnitude of the storage voltage $V_S$ is below a low-side threshold $TH_{LO}$ (e.g., approximately 2.8 volts) at 714. In some cases, the magnitude of the storage voltage $V_S$ may drop below the low-side threshold $TH_{LO}$ when the energy storage element is depleted after powering a movement or movements of the covering material. If the magnitude of the storage voltage $V_S$ is not below the low threshold $TH_{LO}$, the control circuit may exit the procedure 700. If the magnitude of the storage voltage $V_S$ is below the low threshold $TH_{LO}$, the control circuit may enable the power converter circuit. Enabling the power converter circuit may commence charging of the energy storage element (e.g., to ensure the energy storage element possesses sufficient charge for a movement or movements of the covering material).

If the power converter circuit is determined to be enabled at 712, the control circuit may determine if the magnitude of the storage voltage $V_S$ is at or above a high threshold $TH_{HI}$ (e.g., approximately 3.5 volts) at 718. The magnitude of the storage voltage $V_S$ may be at or above the high threshold $TH_{HI}$ if the energy storage element 654 is charged (e.g. to a sufficient level). If the control circuit determines that the magnitude of the storage voltage $V_S$ is not at or above the high threshold $TH_{HI}$ at 718, the control circuit may exit the control procedure 700. If the control circuit determines that the magnitude of the storage voltage $V_S$ is at or above the high threshold $TH_{HI}$ at 718, the control circuit may disable the power converter circuit at 720 and exit the procedure 700. Disabling the power converter circuit may cause the energy storage element to cease charging (e.g. if the energy storage element possesses sufficient charge for a movement or movements of the covering material).

Figure 8:
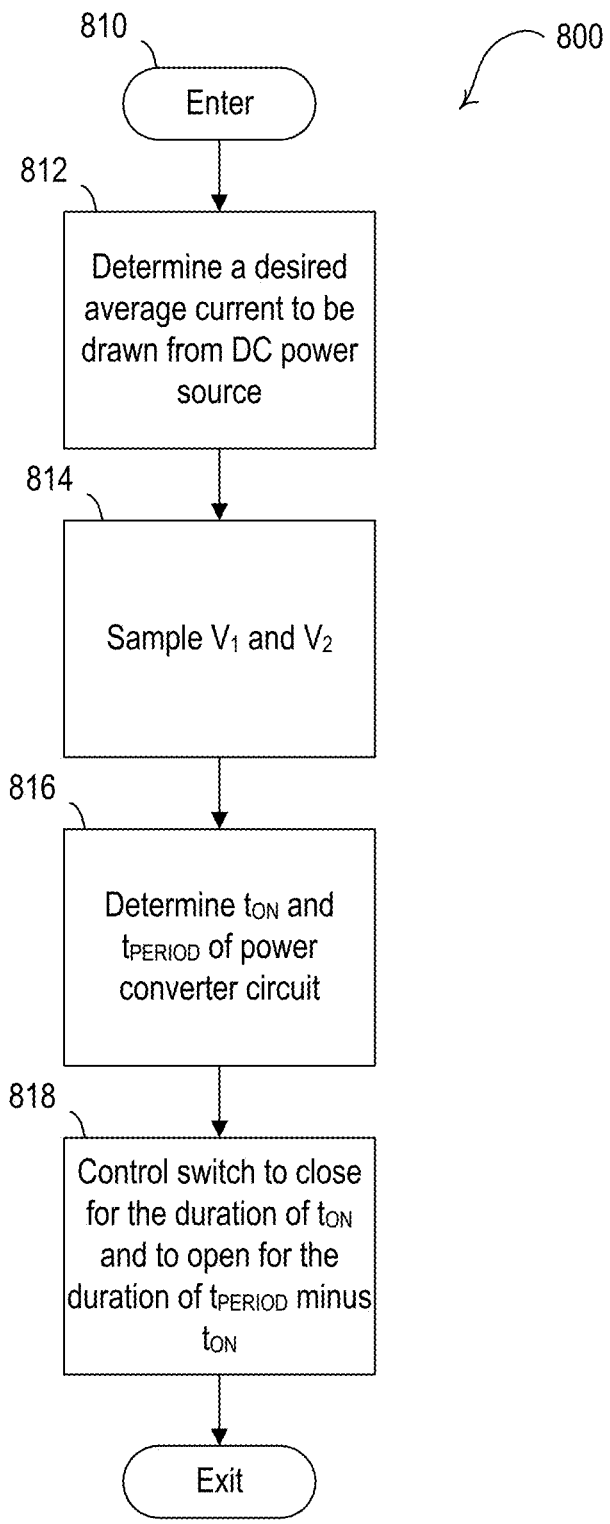
FIG. 8 is a flowchart of a control procedure for charging an energy storage element that may be executed by a control circuit.

FIG. 8 is a flowchart of an example procedure 800 for charging an energy storage element (e.g., the energy storage element 454, 654) from one or more batteries (e.g., the batteries 460, 660). The procedure 800 may be executed by a control circuit of a control device, for example, the converter control circuit 410 and/or the control circuit 630. The procedure 800 may be used to ensure a power converter circuit (e.g., the power converter circuit 452, 652) draws current from the batteries to charge the energy storage element such that a battery current drawn from the batteries does is at a low level (e.g., the desired average current $I_{AVE}$). The control circuit may execute the procedure 800 periodically. For example, the control circuit may execute the procedure at an interval (e.g., an execution period) that is greater than the operating period of the power converter circuit. When the energy storage element comprises one or more supercapacitors, the control circuit may execute the procedure 800, for example, every one second. When the energy storage element comprises one or more rechargeable batteries, the control circuit may execute the procedure 800, for example, every one minute.

The control circuit may start the control procedure 800 at 810. At 812, the control circuit may determine a desired average current (e.g., the desired average current $I_{AVE}$) to be drawn from the batteries 660. For example, the desired average current may be stored in memory in the control device, and the control circuit may retrieve the desired average current from the memory at 812. At 814, the control circuit may determine present magnitudes for an input voltage $V_1$ of the power converter circuit and an output voltage $V_2$ of the power converter circuit (e.g., which may be a storage voltage $V_S$ across the energy storage element). For example, the control circuit may sample the magnitude of the first scaled storage voltage $V_{SS1}$ to determine the magnitude of the input voltage $V_1$ and sample the magnitude of the second scaled storage voltage $V_{SS2}$ to determine the magnitude of the output voltage $V_2$ at 814. At 816, the control circuit may determine an on-time $t_{ON}$ and an operating period $t_{PERIOD}$ to use to control the power converter circuit. For example, the control circuit may determine the on-time $t_{ON}$ and the operating period $t_{PERIOD}$ at 816 based on the magnitude of the input voltage $V_1$ and the magnitude of the output voltage $V_2$ (e.g., as determined at 814). For example, the control circuit may calculate the on-time $t_{ON}$ and the operating period $t_{PERIOD}$ using equations 2 and 3 as shown above. At 818, the control circuit may generate a drive voltage (e.g., the flyback control signal $V_{FC}$) to render a semiconductor switch of the power converter circuit (e.g., the switch S412) conductive for the duration of the determined $t_{ON}$ and non-conductive for the duration of a time period (e.g., an off-time) that is equal to the determined operating period $t_{PERIOD}$ minus the determined on-time $t_{ON}$. Controlling the semiconductor switch of the power converter circuit to be conductive for the on-time $t_{ON}$ and non-conductive for the off-time $t_{OFF}$ (e.g., $t_{OFF}=t_{OFF1}+t_{OFF2}$) may enable the power converter circuit to draw the desired average current from the DC power source (e.g., the batteries 660) while the power converter circuit operates in discontinuous conduction mode.

Figure 9:
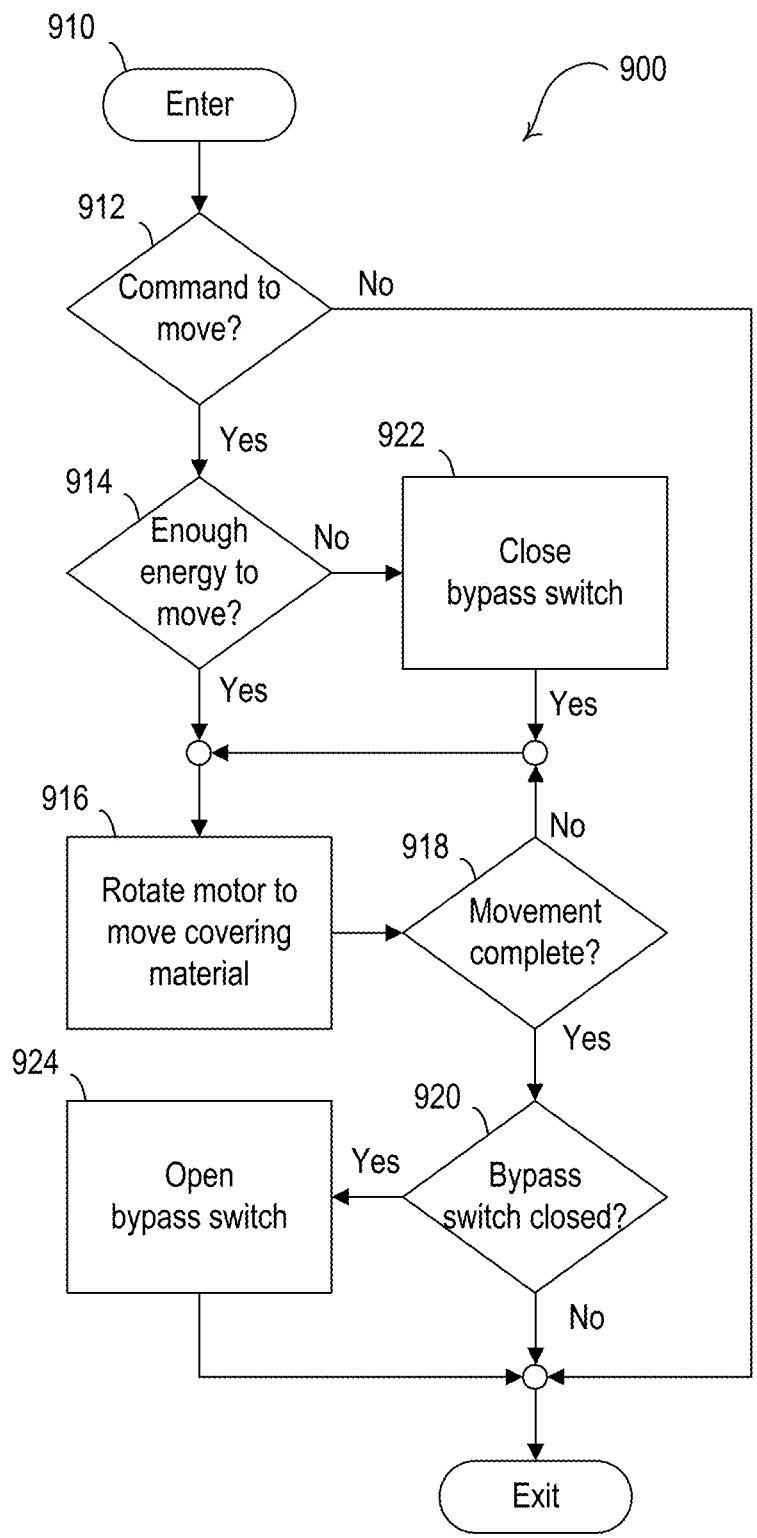
FIG. 9 is a flowchart of a control procedure for controlling a bypass switch that may be executed by a control circuit.

FIG. 9 is a flowchart of an example procedure 900 for controlling a bypass switch (e.g., the controllable switching circuit 662) for selectively powering an electrical load from an energy storage device (e.g., the energy storage device 454, 654). The procedure 900 may be executed by a control circuit of a control device, for example, the converter control circuit 410 and/or the control circuit 630. The energy storage device may be configured to charge from one or more batteries (e.g., the batteries 460, 660) of the control device. The control circuit may control the bypass switch to either power the electrical load from the energy storage element or directly from the batteries. The procedure 900 may be used to ensure that the energy storage element has sufficient energy (e.g., 100 Joules) for powering the electrical load (e.g., for driving the motor to move a covering material of a motorized window treatment. Ensuring the energy storage element has sufficient energy to move the covering material prior to starting to move the covering material may prevent an interruption (e.g., a bump) or slowing in the movement of the covering material (e.g., if the control circuit has to close the bypass switch to change from powering the electrical load from the energy storage element to powering the electrical load from the batteries).

The control circuit may start the control procedure 900 at 910, e.g., in response to receiving a command (e.g., via the communication circuit 642 and/or the user interface 644). At 912, the control circuit may determine if the received command is a command to move the covering material. If the received command is not a command to move the covering material, the control circuit may exit the procedure 900.

If the received command was a command to move the covering material at 912, the control circuit may determine if the energy storage element is sufficiently charged (e.g., has enough energy to complete a movement or an amount of movement of the covering material) at 914. For example, the control circuit may determine if the energy storage element has enough energy to complete a movement or an amount of movement of the covering material at 914 by comparing a present storage level of the energy storage element (e.g., the storage voltage $V_S$) to a threshold. The threshold may indicate a storage level sufficient to complete a full movement of the covering material from the fully-closed position to the fully-open position (e.g., a fixed threshold). In addition, the threshold may vary depending on the amount of movement of the covering material required by the received command, such that the threshold (e.g., a variable threshold) may indicate a storage level sufficient to complete the movement required by the received command. If the energy storage element is sufficiently charged (e.g., has enough energy to move the covering material), the control circuit may rotate the motor to move the shade at 916.

If the energy storage element 654 is not sufficiently charged (e.g., does not have enough energy to move the covering material), the control circuit may close the bypass switch at 922. For example, closing the bypass switch may allow the electrical load (e.g., the motor) to draw current directly from the batteries. Closing the bypass switch may bypass the energy storage element, such that the stored energy of the energy storage element is not required for moving the covering material. After closing the bypass switch at 922, the control circuit may rotate the motor to move the covering material at 916. The control circuit may continue rotating the motor at 916 until the movement of the covering material is complete at 918. When the movement of the covering material is complete at 918, the control circuit may determine if the bypass switch is closed at 920. If the bypass switch is not closed, the control circuit may exit the procedure 900. If the bypass switch is closed at 920, the control circuit may open the bypass switch at 924. After opening the bypass switch at 924, the control circuit may exit the procedure 900.

Batteries (e.g., the batteries 260, the batteries 560, or the batteries 660, such as alkaline batteries) can experience a reduced lifespan when used to power loads that draw high peaks of current for relatively short periods of time and relatively infrequently throughout the day (e.g., "peaky loads"), as compared to loads that draw a smaller, more constant power from the batteries. The batteries can experience a voltage drop that is related to (e.g., proportional to) the magnitude of the current draw. For example, the higher the current draw, the greater the voltage drop that may be experienced by the batteries. Further, the magnitude of voltage drop and/or percentage of voltage drop of the open-circuit battery voltage (e.g., maximum voltage of the batteries) can increase as the open-circuit battery voltage of the batteries decreases over the lifespan of the batteries. That is, the voltage drop may get worse as the batteries get older. Batteries that are used to power peaky loads can experience such a drop to their open-circuit battery voltage that the batteries may still have charge remaining (e.g., as much as 30% of the electrons may remain in the battery), but the batteries may be unable to be used to power the load due to their reduced voltage capacity and the high voltage requirements of the load. Further, in some examples, the batteries may have an increased likelihood of a chemical leak if they are exposed to requests of high peaks of current for relatively short periods of time over the lifetime of the batteries.

The devices, methods, and systems described herein (e.g., such as the motorized window treatments described herein) can be configured to drive peaky loads, but do so by conducting a small, controlled current from the one or more batteries to charge an energy storage element, and then using current from the energy storage element to control power delivered to the load (e.g., a motor to control movement of the covering material). For example, a control circuit and/or power converter of the device may be configured to control the current drawn from the batteries to charge the energy storage element such that the open-circuit battery voltage of the batteries reduces by no more than a set percentage (e.g., when, or immediate before or after, power is delivered to the motor to control movement of the covering material).

The motor drive unit may include a control circuit that is configured to control the battery current such that the open-circuit battery voltage reduces by no more than a set percentage. For example, the control circuit may be configured to control the battery current such that the open-circuit battery voltage reduces by no more than the set percentage when power is delivered to the motor to control movement of the covering material and/or immediately before or after power is delivered to the motor. For instance, the control circuit may be configured to control the battery current to control the voltage drop of the open-circuit battery voltage of the batteries, for example, to prevent instantaneous voltage drops that exceed the set percentage. It should be appreciated that the batteries 660 may eventually experience a voltage drop that exceeds the set percentage, but may only do so over an extended period of time (e.g., multiple years, such as 5 year, 10 years, or more, based on how often the window treatment is used), and may occur after a significant portion (e.g., greater than 95%) of the original battery charge is depleted from the batteries.

In various examples, the set percentage may be 10%, or preferably 5%, or more preferably 3%. By drawing a small, controlled current from the batteries and limiting the voltage drop, the devices may be configured to elongate the life of the batteries and dissipate additional power from the batteries than would be possible if driving the load directly from the batteries and without the use of the energy storage element. Finally, it should be appreciated that the energy storage element, which may include one or more lithium batteries or supercapacitors, does not experience the same voltage drop in its open-circuit voltage as compared to the batteries. As an example, the batteries may be characterized by a voltage drop of at least 0.2 V in response to a draw of 0.5 W, and the energy storage element may be characterized by a voltage drop of no more than 0.04 V in response to a draw of 0.5 W. Further, in some examples, the batteries the batteries (e.g., each battery) may be characterized by a voltage drop in response to a draw of 0.5 W that is at least 10 times larger than a voltage drop of the energy storage element in response to a draw of 0.5 W. Therefore, the energy storage element may be selected such that it can handle the high current demands of the load (e.g., motor) and sustain relatively small affects to its open-circuit voltage characteristics.

Figure 10:
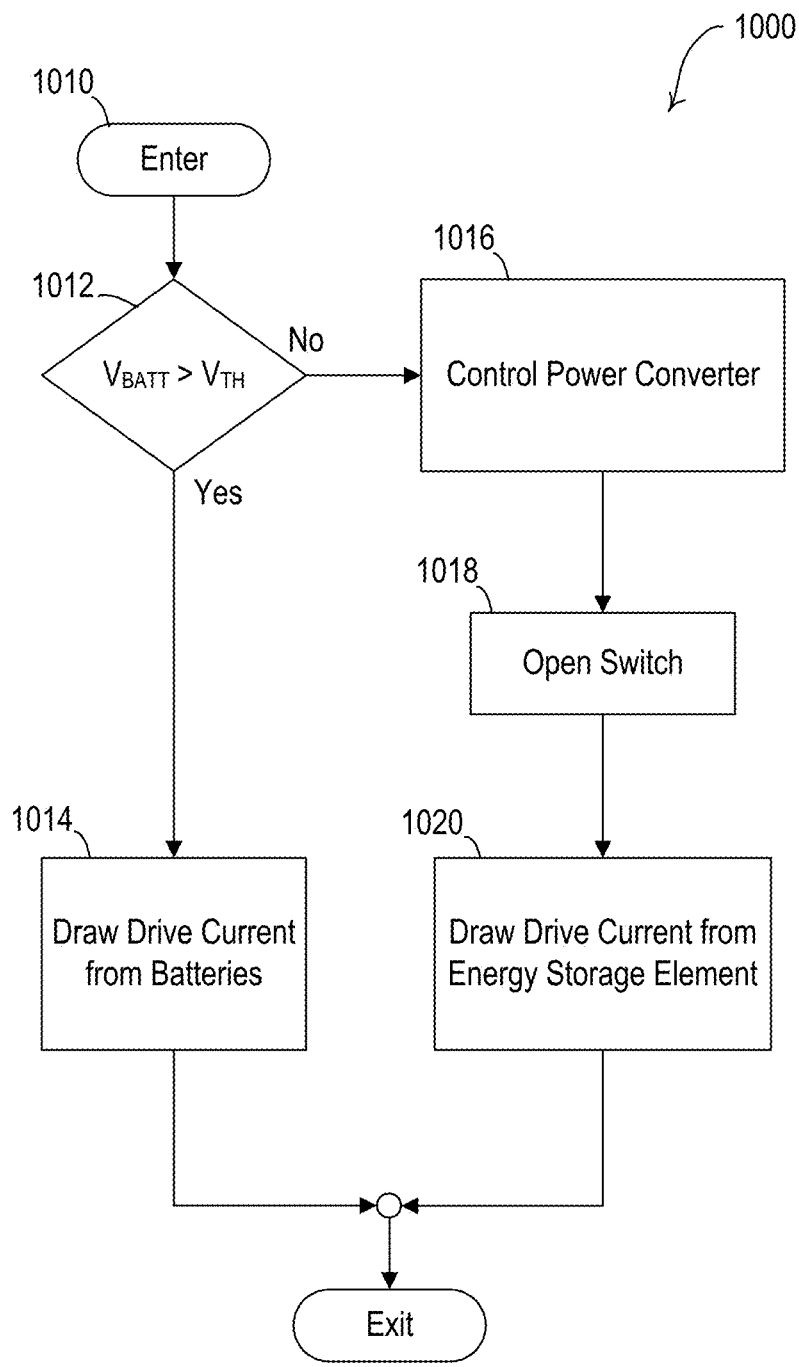
FIG. 10 is a flowchart of an example procedure for driving a load by drawing current from one or more batteries or from an energy storage element.

FIG. 10 is a flowchart of an example procedure 1000 for driving a load (e.g., a motor that controls movements of a covering material of a motorized window treatment) by drawing current from one or more batteries (e.g., the batteries 460, 660) or from an energy storage element (e.g., the energy storage element 454, 654). The procedure 1000 may be executed by a control circuit of a device, for example, the converter control circuit 410 and/or the control circuit 630 of a motorized window treatment. The procedure 1000 may be used to switch between a first mode and a second mode. The control circuit may execute the procedure 1000 periodically as a maintenance procedure. Alternatively or additionally, the control circuit may execute the procedure 1000 in response to a command to drive the load (e.g., power the motor to move a covering material of the motorized window treatment). If the procedure 1000 is performed in response to a command to drive the load, then, in some examples, 1016 may be omitted.

The control circuit may start the control procedure 1000 at 1010. At 1012, the control circuit may compare the battery voltage $V_{BATT}$ to a threshold voltage $V_{TH}$ (e.g., 1.4 V). If the control circuit determines that the battery voltage $V_{BATT}$ (e.g., the open-circuit battery voltage of the batteries) is greater than the threshold voltage $V_{TH}$ at 1012, the control circuit may configure the drive unit (e.g., the motor drive circuit 620) to draw current from the batteries to control the power delivered to the load. For example, the control circuit may operate in a first mode where, upon receiving a command to drive the load, the control circuit may draw the drive current (e.g., the motor current $I_{MOTOR}$) from the batteries (e.g., directly from the batteries) to power the load. The device may include a switch (e.g., a bypass switch, such as the controllable switching circuit 662), and in such instances, the control circuit may check to ensure the switch is closed. If the switch is open, the control circuit may generate a switch control signal (e.g., the switch control signal $V_{SW}$) for rendering the switch conductive to bypass an energy storage element (e.g., the energy storage element 654) of the device and to allow the drive unit to draw current directly from the batteries. The procedure 1000 may then exit.

If the control circuit determines that the battery voltage $V_{BATT}$ (e.g., the open-circuit battery voltage of the batteries) is less than the threshold voltage $V_{TH}$ at 1010, the control circuit may control a power converter (e.g., the power converter 652), for example, to charge the energy storage element at 1016. However, in some examples, if the energy storage element is already charged, then 1016 may be omitted. At 1018, the control circuit may render the switch non-conductive to operate in the second mode and to cause the drive unit to draw the current from the energy storage element to control the power delivered to the load (e.g., instead of the batteries) at 1020, and the procedure 1000 may exit. When operating in the second mode, the control circuit may be configured to conduct the battery current $V_{BATT}$ from the batteries to charge the energy storage element, for example, as described herein, but the control circuit may drive the load using the energy stored within the energy storage element.

By operating in the second mode after the battery voltage $V_{BATT}$ falls below the threshold voltage $V_{TH}$, the control circuit may, for example, allow for more energy to be depleted out of the batteries for use to control the load by drawing the current out of the batteries at a voltage level that is less than what is required to control the load (e.g., and also leverage the higher voltage potential (e.g., reduced voltage drop) provided by the energy storage element). Further, in some examples, the battery voltage $V_{BATT}$ may be greater than the threshold voltage $V_{TH}$ when the batteries are relatively new, and after many uses of directly powering a peaky load, the battery voltage $V_{BATT}$ may fall below the threshold voltage $V_{TH}$. So by operating the procedure 1000, the control circuit may use the batteries when they have a larger open-circuit battery voltage, and switch to use of the energy storage element when the open-circuit battery voltage falls below the threshold voltage $V_{TH}$.

Alternatively or additionally, the control circuit may be configured to switch between modes during operations of the motor. For instance, the control circuit may be configured to operate in the first mode of operation when the current needed by the motor to control movement of the covering material is below a threshold current, and operate in the second mode of operation when a current needed by the motor to control movement of the covering material is above the threshold current.

Figure 11:
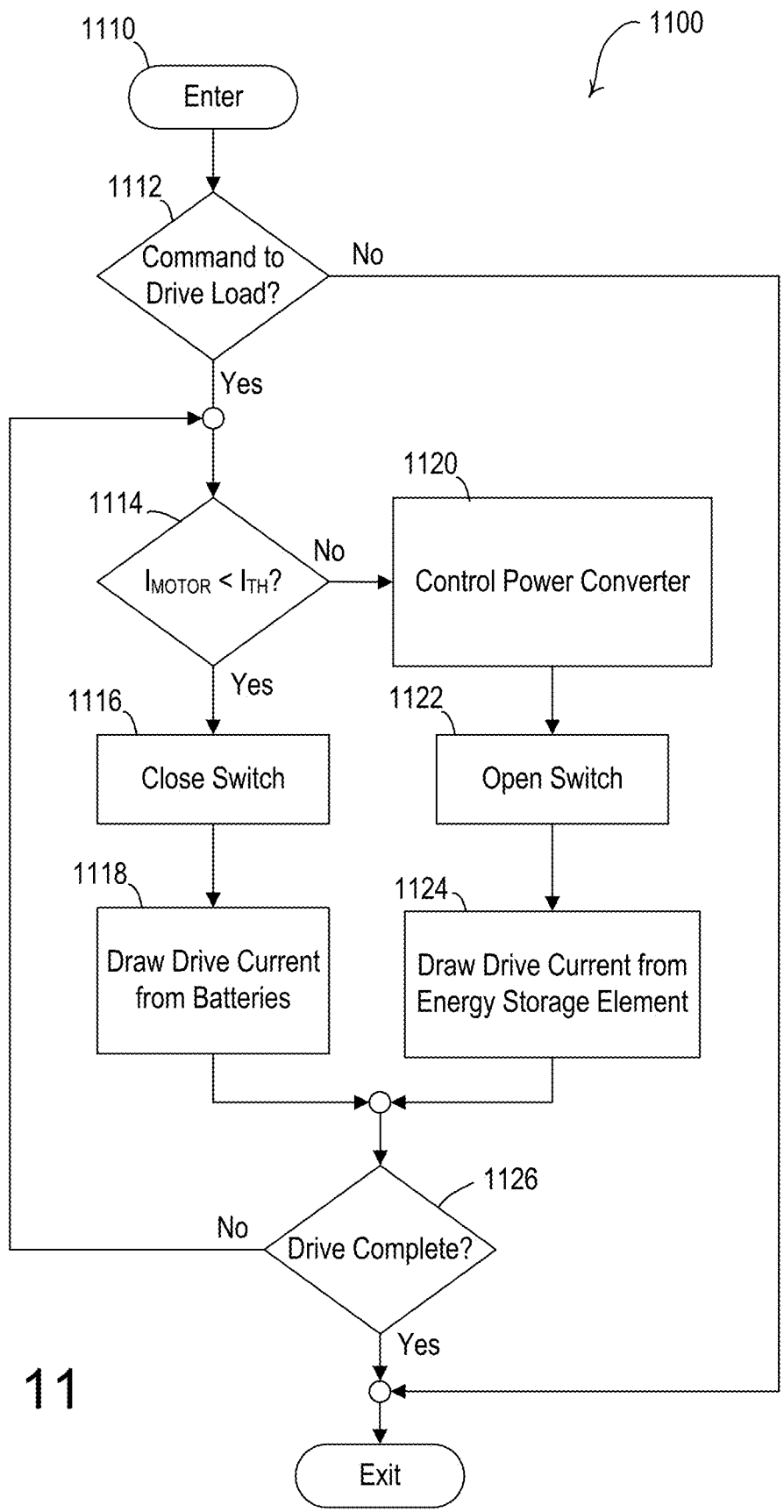
FIG. 11 is a flowchart of an example procedure for driving a load by drawing current from one or more batteries or from an energy storage element.

FIG. 11 is a flowchart of an example procedure 1100 for driving a load (e.g., a motor that controls movements of a covering material of a motorized window treatment) by drawing current from one or more batteries (e.g., the batteries 460, 660) or from an energy storage element (e.g., the energy storage element 454, 654). The procedure 1100 may be executed by a control circuit of a device, for example, the converter control circuit 410 and/or the control circuit 630 of a motorized window treatment. The procedure 1100 may be used to switch between a first mode and a second mode, and as noted, may be used as an alternative to or in addition to the procedure 1000. The control circuit may execute the procedure 1100 periodically. Alternatively or additionally, the control circuit may execute the procedure 1100 in response to a command to drive the load (e.g., power the motor to move a covering material of the motorized window treatment). If performed in response to a command to drive the load, then 1112 may be omitted.

The control circuit may start the control procedure 1100 at 1110. When starting the control procedure 1100, a switch (e.g., a bypass switch, such as the controllable switching circuit 662) may be in the open position. At 1112, the control circuit may determine whether it received a command to drive the load (e.g., a command to drive a motor to move a covering material of a motorized window treatment). If the control circuit determines that it did not receive a command to drive the load at 1112, then the control procedure 1100 may exit. If the control circuit determines that it received a command to drive the load at 1112, then the control circuit may determine whether a drive current required to drive the load (e.g., the motor current $I_{MOTOR}$ required by the motor drive circuit 620 to rotate the motor 610) is less than a current threshold $I_{TH}$ (e.g., 50-500 mA).

If the control circuit determines that the motor current $I_{MOTOR}$ is less than a current threshold $T_{TH}$ at 1114, the control circuit may close the switch to operate in the first mode at 1116. In some examples, the switch may already be closed, and in such instances, 1116 may be omitted. At 1118, the control circuit may draw the drive current (e.g., the motor current $I_{MOTOR}$) from the batteries (e.g., directly from the batteries) to drive the load. At 1126, the control circuit may determine whether the driving of the load is completed (e.g., whether a movement of a covering material as directed by the received command is complete). If so, the procedure 1100 may exit. However, if the driving of the load is not complete at 1126, then the procedure 1100 may return to 1114.

If the control circuit determines that the motor current $I_{MOTOR}$ is greater than a current threshold $I_{TH}$ at 1114, the control circuit may control a power converter (e.g., the power converter 652) at 1120, for example, to charge the energy storage element. However, in some examples, if the energy storage element is already charged, then 1120 may be omitted. At 1122, the control circuit may render the switch non-conductive to operate in the second mode. At 1224, the control circuit may cause the drive unit to draw the current from the energy storage element to control the power delivered to the load (e.g., instead of the batteries). When operating in the second mode, the control circuit may be configured to conduct the battery current $V_{BATT}$ from the batteries to charge the energy storage element, for example, as described herein, but the control circuit may drive the load using the energy stored within the energy storage element. The control circuit may determine whether the driving of the load is completed at 1126. If so, the procedure 1100 may exit.

Accordingly, through the procedure 1100, the control circuit may operate in the second mode when the motor current $I_{MOTOR}$ required by the motor drive circuit to rotate the motor is above a current threshold I'm (e.g., 50-500 mA), and may operate in the first mode (e.g., switch to the first mode) when the motor current $I_{MOTOR}$ required by the motor drive circuit to rotate the motor is below the current threshold. An example of when this might occur is during the movement of the covering material between a fully-closed position to a fully-open position where the power, and in turn the motor current $I_{MOTOR}$, needed to drive the motor might be above the current threshold for at least the initial movement of the covering material, but when the covering material is close to the fully-open position, the motor current $I_{MOTOR}$ may reduce below the current threshold and the control circuit may operate in the first mode to drive the motor from the batteries (e.g., directly from the batteries). In some examples, the motor current $I_{MOTOR}$ may cross the current threshold $I_{TH}$ during some, but not all movements of the covering material. Further, in some examples, the motor current $I_{MOTOR}$ may cross the current threshold $I_{TH}$ at the end of the movement of the covering material, and/or multiple times during the movement of the covering material. For instance, some movements of the covering material may have a motor current $I_{MOTOR}$ profile that looks like a parabola (or upside down parabola), for example, in instances where the motorized window treatments includes a torsion spring. In such examples, the motor current $I_{MOTOR}$ may cross the current threshold $I_{TH}$ multiple times during a single movement of the covering material.

Although described primarily in the contact of a motorized window treatment that includes a motor for moving a covering material to control an amount of daylight entering a space, the methods, systems, and apparatuses described herein may be used with any load types, particularly loads that draw high peaks of current for relatively short periods of time and relatively infrequently throughout the day (e.g., motors, exhaust fans, elevators, lifts, emergency lighting, lights on for a short period of time, such as egress lightings, microwaves or other small appliances, etc.).

What is claimed is:
1. A motorized window treatment comprising:
a compartment configured to receive one or more batteries, wherein the one or more batteries are configured to produce a battery voltage and defined by an open-circuit voltage; and
a motor drive unit comprising:
a motor configured to control movement of a covering material of the motorized window treatment;
an energy storage element configured to store a storage voltage;
a power converter circuit configured to conduct a battery current from the one or more batteries to charge the energy storage element to produce the storage voltage across the energy storage element;
a motor drive circuit configured to draw a motor current from the energy storage element to control power delivered to the motor to control movement of the covering material; and
a control circuit configured to adjust a duty cycle for controlling the power converter circuit to control the battery current such that a voltage drop of the battery voltage does not exceed a set percentage of the open-circuit voltage when power is being delivered to the motor to control movement of the covering material.

2. The motorized window treatment of claim 1, wherein the set percentage is 5%.

3. The motorized window treatment of claim 1, wherein the set percentage is 3%.

4. The motorized window treatment of claim 1, wherein the energy storage element comprises one or more lithium batteries.

5. The motorized window treatment of claim 1, wherein the energy storage element comprises one or more supercapacitors.

6. The motorized window treatment of claim 1, wherein the one or more batteries comprise alkaline batteries, and wherein the energy storage element comprises one or more lithium batteries.

7. The motorized window treatment of claim 1, wherein the compartment is configured to allow the one or more batteries to be removable and replaceable.

8. The motorized window treatment of claim 1, wherein the one or more batteries are characterized by a voltage drop of the battery voltage of at least 0.2 V in response to a draw of 0.5 W, and wherein the energy storage element is characterized by a voltage drop of the storage voltage of no more than 0.04 V in response to a draw of 0.5 W.

9. The motorized window treatment of claim 1, wherein the one or more batteries are characterized by a voltage drop of the battery voltage in response to a draw of 0.5 W that is at least 10 times larger than a voltage drop of the storage voltage of the energy storage element in response to a draw of 0.5 W.

10. The motorized window treatment of claim 1, further comprising:
a covering material configured to be raised and lowered to control an amount of daylight entering a space.

11. The motorized window treatment of claim 1, wherein the control circuit is configured to adjust the duty cycle for controlling the power converter circuit by adjusting an on-time and an operating period for a semiconductor switch of the power converter circuit.

12. The motorized window treatment of claim 1, further comprising a spring assist assembly that is configured to reduce the torque required from the motor drive unit to control movement of the covering material.

13. The motorized window treatment of claim 12, wherein the spring assist assembly is configured such that the motor drive unit can operate at a substantially constant torque as the covering material is raised and lowered.

14. The motorized window treatment of claim 1, wherein the control circuit is configured to cause the motor drive circuit to draw the battery current from the energy storage element when the battery voltage is at or above a voltage level that is required to power the motor to control movement of the covering material, wherein the one or more batteries are unable to provide the battery current that is required to power the motor to control movement of the covering material from a fully-closed and fully-open position when the one or more batteries have less than 30% of their maximum energy density.

15. The motorized window treatment of claim 14, wherein, when the one or more batteries have less than 30% of their maximum energy density, the battery voltage is below the voltage level required to provide the battery current at the voltage level that is required to power the motor to control movement of the covering material.

16. The motorized window treatment of claim 1, wherein the control circuit is configured to control the power converter such that the battery current conducted by the power converter from the one or more batteries to charge the energy storage element does not exceed a threshold current.

17. The motorized window treatment of claim 16, wherein the threshold current is characterized by the one or more batteries maintaining a discharging rate (C-rate) less than 0.01 C.

18. The motorized window treatment of claim 1, wherein the control circuit configured to operate in a first mode where the motor drive circuit draws the battery current from the one or more batteries to control the power delivered to the motor to control movement of the covering material, and operate in a second mode where the motor drive circuit draws the motor current from the energy storage element to control the power delivered to the motor to control movement of the covering material.

19. The motorized window treatment of claim 18, wherein the control circuit is configured to operate in the first mode when a magnitude of the battery voltage of the one or more batteries is above a threshold voltage, and operate in the second mode when the magnitude of the battery voltage of the one or more batteries is below the threshold voltage.

20. The motorized window treatment of claim 18, wherein the control circuit is configured to operate in the first mode of operation when a first magnitude of the motor current required by the motor to control movement of the covering material is below a threshold current, and operate in the second mode of operation when a second magnitude of the motor current required by the motor to control movement of the covering material is above the threshold current.

21. The motorized window treatment of claim 1, wherein, to adjust the duty cycle for controlling the power converter circuit, the control circuit is configured to:
determine an on-time and an operating period for controlling a semiconductor switch of the power converter circuit to control a magnitude of the battery current conducted by the power converter from the one or more batteries to a desired average current; and
control the semiconductor switch of the power converter circuit in accordance with the on-time and the operating period.

22. The motorized window treatment of claim 21, wherein the desired average current is set such that the open-circuit voltage reduces by no more than 10% when power is delivered to the motor to control movement of the covering material.

23. The motorized window treatment of claim 21, wherein the power converter circuit comprises a transformer having a primary winding coupled in series with the semiconductor switch, wherein the primary winding is configured to conduct a primary current through the semiconductor switch when the semiconductor switch is conductive.

24. The motorized window treatment of claim 1, wherein the control circuit is configured to generate an enable signal based on a magnitude of the storage voltage, the control circuit configured to enable or disable the power converter circuit in response to the magnitude of the storage voltage.

25. The motorized window treatment of claim 24, wherein the power converter circuit is configured to charge the energy storage element when enabled by the enable signal.

26. The motorized window treatment of claim 24, wherein the control circuit configured to enable or disable the power converter circuit in response to the magnitude of the storage voltage comprises the control circuit being configured to enable the power converter circuit when the magnitude of the storage voltage is less than a first threshold value, and disable the power converter circuit when the magnitude of the storage voltage is greater than a second threshold value.

27. The motorized window treatment of claim 1, wherein the control circuit is configured to:
determine a magnitude of an input voltage of the power converter circuit and a magnitude of the storage voltage of the energy storage element; and
set the duty cycle for controlling the power converter circuit based on the magnitude of the input voltage and the magnitude of the storage voltage.

28. The motorized window treatment of claim 27, wherein the control circuit is configured to:

calculated an on-time and an operating period for controlling the power converter circuit based on a desired average current conducted through the one or more batteries, the magnitude of the input voltage, and the magnitude of the storage voltage;

wherein the duty cycle is dependent on the on-time and the operating period for controlling the power converter circuit.

* * * * *